United States Patent
Rahman et al.

(10) Patent No.: US 11,743,833 B2
(45) Date of Patent: Aug. 29, 2023

(54) METHOD AND APPARATUS FOR UPLINK TRANSMIT BEAM SELECTION PROCEDURES

(71) Applicant: Samsung Electronics Co., Ltd., Suwon-si (KR)

(72) Inventors: Md. Saifur Rahman, Plano, TX (US); Gilwon Lee, Plano, TX (US); Eko Onggosanusi, Coppell, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 17/357,762

(22) Filed: Jun. 24, 2021

(65) Prior Publication Data
US 2022/0007299 A1    Jan. 6, 2022

Related U.S. Application Data

(60) Provisional application No. 63/173,962, filed on Apr. 12, 2021, provisional application No. 63/073,099, filed on Sep. 1, 2020, provisional application No. 63/048,466, filed on Jul. 6, 2020.

(51) Int. Cl.
*H04W 72/04* (2023.01)
*H04W 52/14* (2009.01)
*H04W 52/36* (2009.01)
*H04W 52/24* (2009.01)
*H04W 52/42* (2009.01)

(52) U.S. Cl.
CPC ....... *H04W 52/146* (2013.01); *H04W 52/243* (2013.01); *H04W 52/365* (2013.01); *H04W 52/42* (2013.01)

(58) Field of Classification Search
CPC ..... H04W 16/28; H04W 72/14; H04W 52/24; H04W 76/27; H04W 72/04; H04W 24/10; H04W 74/00; H04B 17/318; H04B 7/0408; H04B 7/02; H04B 7/0404
See application file for complete search history.

(56) References Cited

U.S. PATENT DOCUMENTS

| | | |
|---|---|---|
| 2019/0261289 A1 | 8/2019 | Raghavan et al. |
| 2020/0112926 A1 | 4/2020 | Laghate et al. |
| 2021/0297959 A1* | 9/2021 | Zhou .................... H04B 7/0602 |

OTHER PUBLICATIONS

Sony, "Enhancements on multi-beam operation", 3GPP TSG RAN WG1#98 meeting, Aug. 26-30, 2019, R1-1908784, 9 pages.
ZTE, "Enhancements on multi-beam operation", 3GPP TSG RAN WG1 Meeting #98, Aug. 26-30, 2019, R1-1908192, 26 pages.
(Continued)

*Primary Examiner* — Tu X Nguyen

(57) ABSTRACT

A method for operating a user equipment comprises receiving configuration information including information on measurement reference signal (RS) resources and information on a beam reporting; receiving the measurement RS resources; measuring the measurement RS resources; determining, based on the measured measurement RS resources, the beam reporting; and transmitting the beam reporting, wherein the beam reporting includes: $Q_1$ pairs of (I1, J1), wherein I1 comprises a first resource indicator and J1 comprises a first beam metric, and an additional information including a second metric.

20 Claims, 17 Drawing Sheets

(56) References Cited

OTHER PUBLICATIONS

Intel Corporation, "Discussion on multi-beam enhancements", 3GPP TSG RAN WG1 #98, Aug. 26-30, 2019, R1-1908654, 16 pages.
International Search Report dated Oct. 14, 2021 in connection with International Patent Application No. PCT/KR2021/008589, 3 pages.
Written Opinion of the International Searching Authority dated Oct. 14, 2021 in connection with International Patent Application No. PCT/KR2021/008589, 4 pages.
"3rd Generation Partnership Project; Technical Specification Group Radio Access Network; Evolved Universal Terrestrial Radio Access (E-UTRA); Physical channels and modulation (Release 16)", 3GPP TS 36.211 V16.5.0, Mar. 2021, 249 pages.
"3rd Generation Partnership Project; Technical Specification Group Radio Access Network; Evolved Universal Terrestrial Radio Access (E-UTRA); Multiplexing and channel coding (Release 16)", 3GPP TS 36.212 V16.5.0, Mar. 2021, 255 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.5.0, Mar. 2021, 577 pages.
"LTE; Evolved Universal Terrestrial Radio Access (E-UTRA); Medium Access Control (MAC) protocol specification (3GPP TS 36.321 version 16.4.0 Release 16)", ETSI TS 136 321 V16.4.0, Apr. 2021, 144 pages.
"LTE; Evolved Universal Terrestrial Radio Access (E-UTRA); Radio Resource Control (RRC); Protocol specification (3GPP TS 36.331 version 16.4.0 Release 16)", ETSI TS 136 331 V16.4.0, Apr. 2021, 1093 pages.
"5G; NR; Physical channels and modulation (3GPP TS 38.211 version 16.5.0 Release 16)", ETSI TS 138 211 V16.5.0, Apr. 2021, 138 pages.
"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Physical layer measurements (3GPP TS 38.215 version 16.4.0 Release 16)", ETSI TS 138 215 V16.4.0, Jan. 2021, 31 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.

* cited by examiner

METHOD AND APPARATUS FOR UPLINK TRANSMIT BEAM SELECTION PROCEDURES

CROSS-REFERENCE TO RELATED APPLICATIONS AND CLAIM OF PRIORITY

The present application claims priority to U.S. Provisional Patent Application No. 63/048,466, filed on Jul. 6, 2020, U.S. Provisional Patent Application No. 63/073,099, filed on Sep. 1, 2020, and U.S. Provisional Patent Application No. 63/173,962, filed on Apr. 12, 2021. The content of the above-identified patent documents is incorporated herein by reference.

TECHNICAL FIELD

The present disclosure relates generally to wireless communication systems and more specifically to uplink transmit beam selection.

BACKGROUND

Understanding and correctly estimating the channel between a user equipment (UE) and a gNode B (gNB) is important for efficient and effective wireless communication. In order to correctly estimate the downlink (DL) channel conditions, the gNB may transmit a reference signal, e.g., CSI-RS, to the UE for DL channel measurement, and the UE may report (e.g., feedback) information about channel measurement, e.g., CSI, to the gNB. Likewise, for uplink (UL), the UE may transmit reference signal, e.g., SRS, to the gNB for UL channel measurement. With the DL and UL channel measurements, the gNB is able to select appropriate communication parameters to efficiently and effectively perform wireless data communication with the UE. For a millimeter wave communication systems, the reference signal can correspond to a spatial beam, and the CSI can correspond to a beam report which indicates a preferred spatial beam for communication. In such beamformed systems, a beam indication mechanism is needed in order to align the spatial beams at both gNB and UE.

SUMMARY

Embodiments of the present disclosure provide methods and apparatuses to enable uplink transmit beam selection.

In one embodiment, a UE in a wireless communication system is provided. The UE includes a transceiver configured to: receive configuration information including information on measurement reference signal (RS) resources and information on a beam reporting; and receive the measurement RS resources. The UE further includes a processor operably coupled to the transceiver. The processor is configured to: measure the measurement RS resources; and determine, based on the measured measurement RS resources, the beam reporting, wherein the transceiver is further configured to transmit the beam reporting, wherein the beam reporting includes: $Q_1$ pairs of (I1, J1), wherein I1 comprises a first resource indicator and J1 comprises a first beam metric, and an additional information including a second metric.

In another embodiment, a BS in a wireless communication system is provided. The BS includes a processor configured to generate configuration information including information on measurement reference signal (RS) resources and information on a beam reporting. The BS further includes a transceiver operably coupled to the processor. The transceiver is configured to: transmit the configuration information; transmit the measurement RS resources; and receive an uplink transmission including a beam reporting, wherein the beam reporting includes: $Q_1$ pairs of (I1, J1), wherein I1 comprises a first resource indicator and J1 comprises a first beam metric, and an additional information including a second metric.

In yet another embodiment, a method for operating a UE is provided. The method comprises: receiving configuration information including information on measurement reference signal (RS) resources and information on a beam reporting; receiving the measurement RS resources; measuring the measurement RS resources; determining, based on the measured measurement RS resources, the beam reporting; and transmitting the beam reporting, wherein the beam reporting includes: $Q_1$ pairs of (I1, J1), wherein I1 comprises a first resource indicator and J1 comprises a first beam metric, and an additional information including a second metric.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
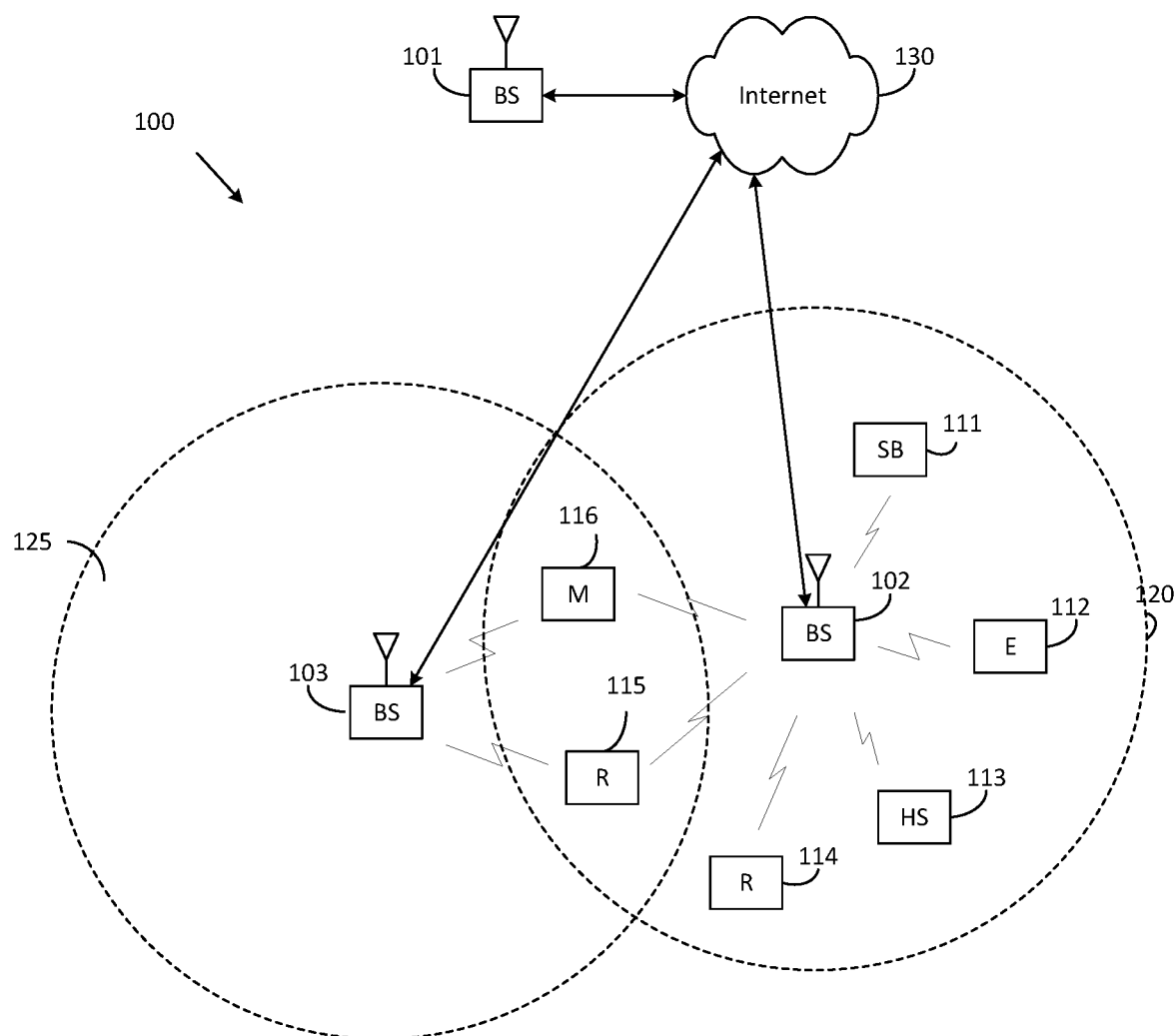
FIG. 1 illustrates an example wireless network according to embodiments of the present disclosure.

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.5.0, "E-UTRA, Physical channels and modulation" (herein "REF 1"); 3GPP TS 36.212 v16.5.0, "E-UTRA, Multiplexing and Channel coding" (herein "REF 2"); 3GPP TS 36.213 v16.5.0, "E-UTRA, Physical Layer Procedures" (herein "REF 3"); 3GPP TS 36.321 v16.4.0, "E-UTRA, Medium Access Control (MAC) protocol specification" (herein "REF 4"); 3GPP TS 36.331 v16.4.0, "E-UTRA, Radio Resource Control (RRC) protocol specification" (herein "REF 5"); 3GPP TS 38.211 v16.5.0, "NR, Physical channels and modulation" (herein "REF 6"); 3GPP TS 38.212 v16.5.0, "NR, Multiplexing and Channel coding" (herein "REF 7"); 3GPP TS 38.213 v16.4.0, "NR, Physical Layer Procedures for Control" (herein "REF 8"); 3GPP TS 38.214 v16.4.0, "NR, Physical Layer Procedures for Data" (herein "REF 9"); 3GPP TS 38.215 v16.4.0, "NR, Physical Layer Measurements" (herein "REF 10"); 3GPP TS 38.321 v16.4.0, "NR, Medium Access Control (MAC) protocol specification" (herein "REF 11"); and 3GPP TS 38.331 v16.4.1, "NR, Radio Resource Control (RRC) Protocol Specification" (herein "REF 12").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
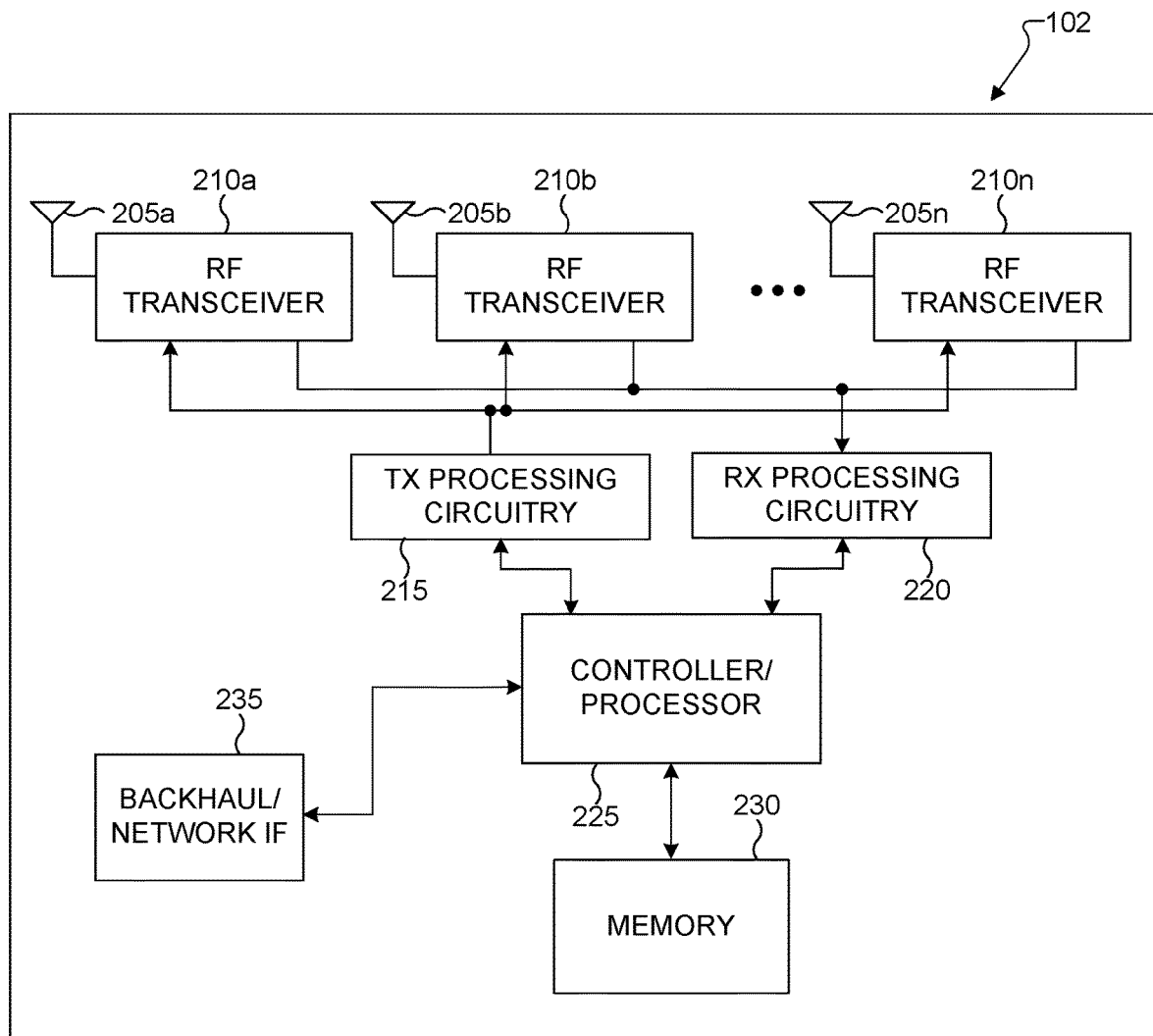
FIG. 2 illustrates an example gNB according to embodiments of the present disclosure.
Figure 3:
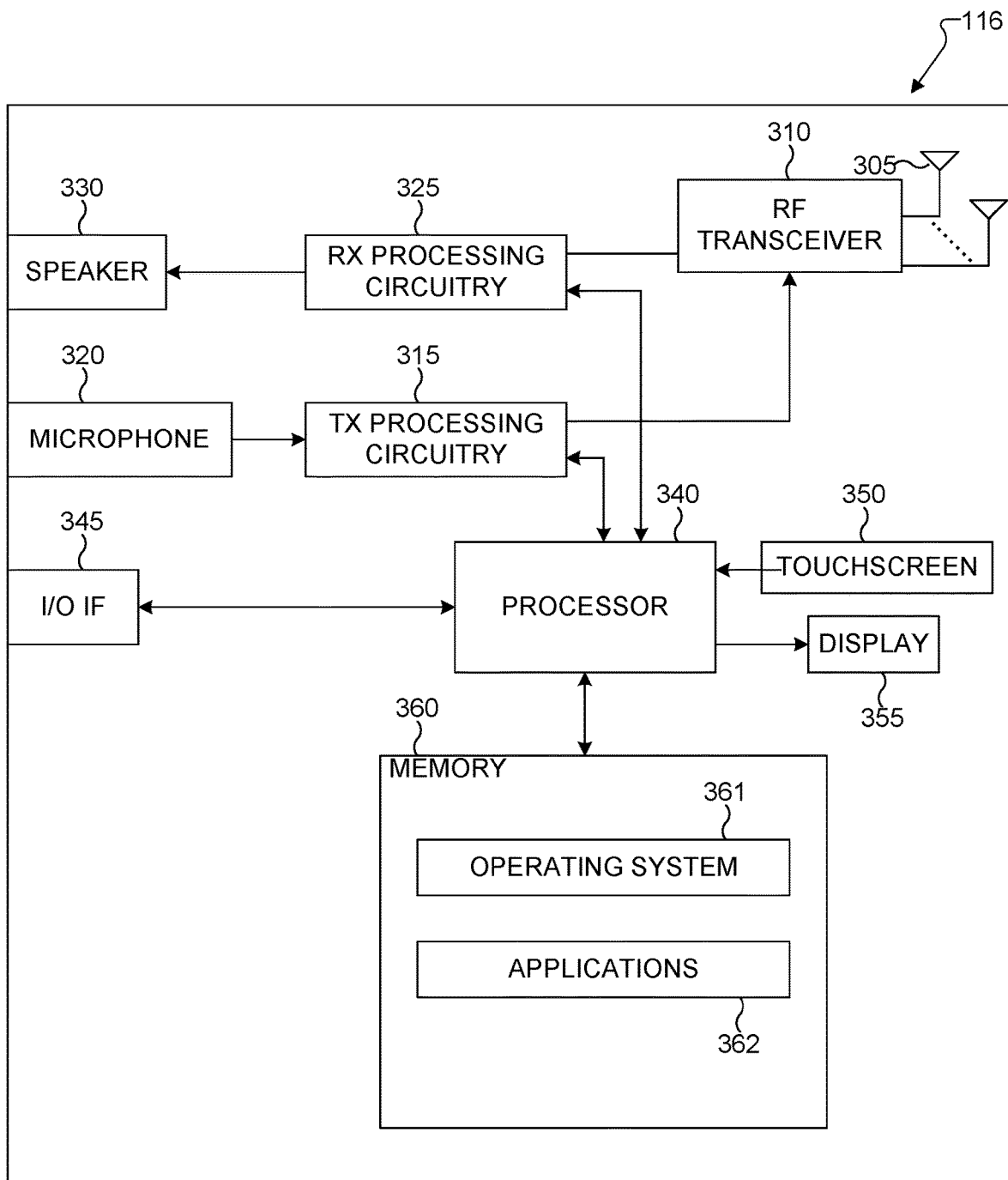
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information including information on measurement reference signal (RS) resources and information on a beam reporting; receiving the measurement RS resources; measuring the measurement RS resources; determining, based on the measured measurement RS resources, the beam reporting; and transmitting the beam reporting, wherein the beam reporting includes: $Q_1$ pairs of (I1, J1), wherein I1 comprises a first resource indicator and J1 comprises a first beam metric, and an additional information including a second metric. One or more of the gNBs 101-103 includes circuitry, programing, or a combination thereof, for generating configuration information including information on measurement reference signal (RS) resources and information on a beam reporting; transmitting the configuration information; transmitting the measurement RS resources; and receiving an uplink transmission including a beam reporting, wherein the beam reporting includes: $Q_1$ pairs of (I1, J1), wherein I1 comprises a first resource indicator and J1 comprises a first beam metric, and an additional information including a second metric.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information including information on measurement reference signal (RS) resources and information on a beam reporting; receiving the measurement RS resources; measuring the measurement RS resources; determining, based on the measured measurement RS resources, the beam reporting; and transmitting the beam reporting, wherein the beam reporting includes: $Q_1$ pairs of (I1, J1), wherein I1 comprises a first resource indicator and J1 comprises a first beam metric, and an additional information including a second metric. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
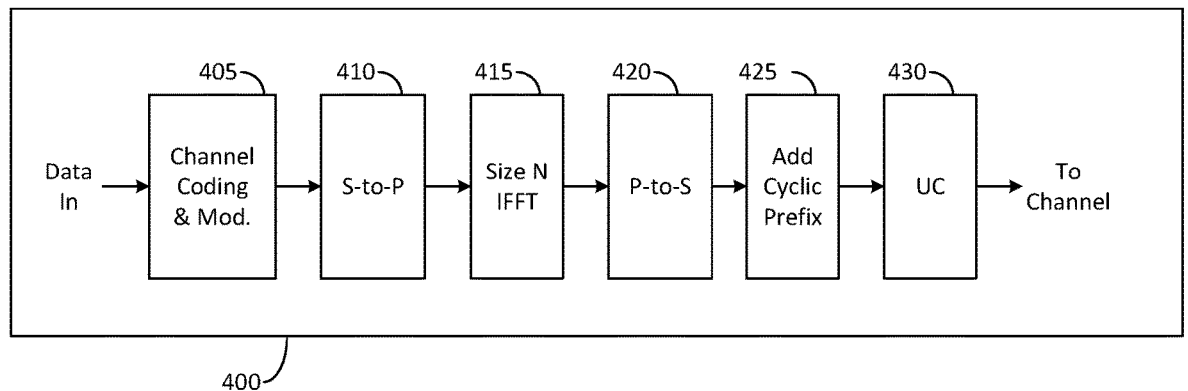
FIG. 4A illustrates a high-level diagram of an orthogonal frequency division multiple access transmit path according to embodiments of the present disclosure.
Figure 4B:
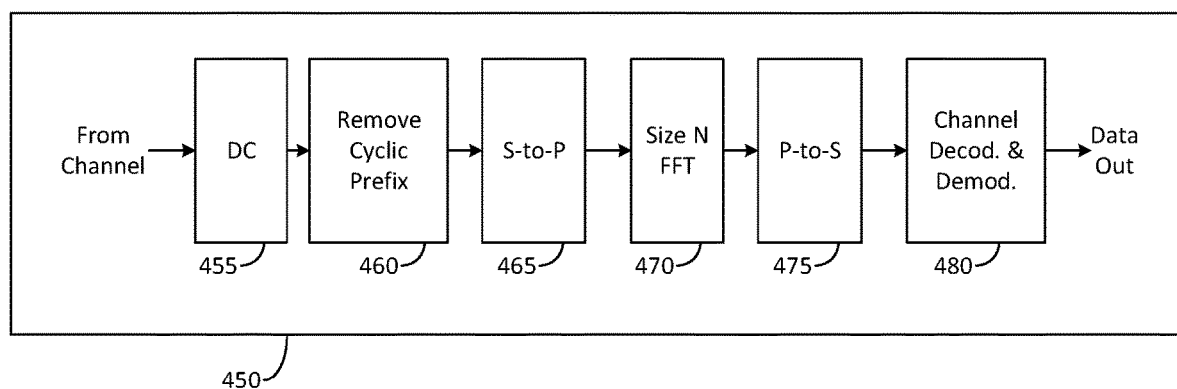
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{EPDCCH}$ sub-carriers, or resource elements (REs), such as 12 REs. A unit of one RB over one subframe is referred to as a PRB. A UE can be allocated $n_s=(n_{s0}+\gamma \cdot N_{EPDCCH})$ mod D RBs for a total of $Z=O_F+\lfloor n_{s0}+\gamma \cdot N_{EPDCCH})/D \rfloor$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
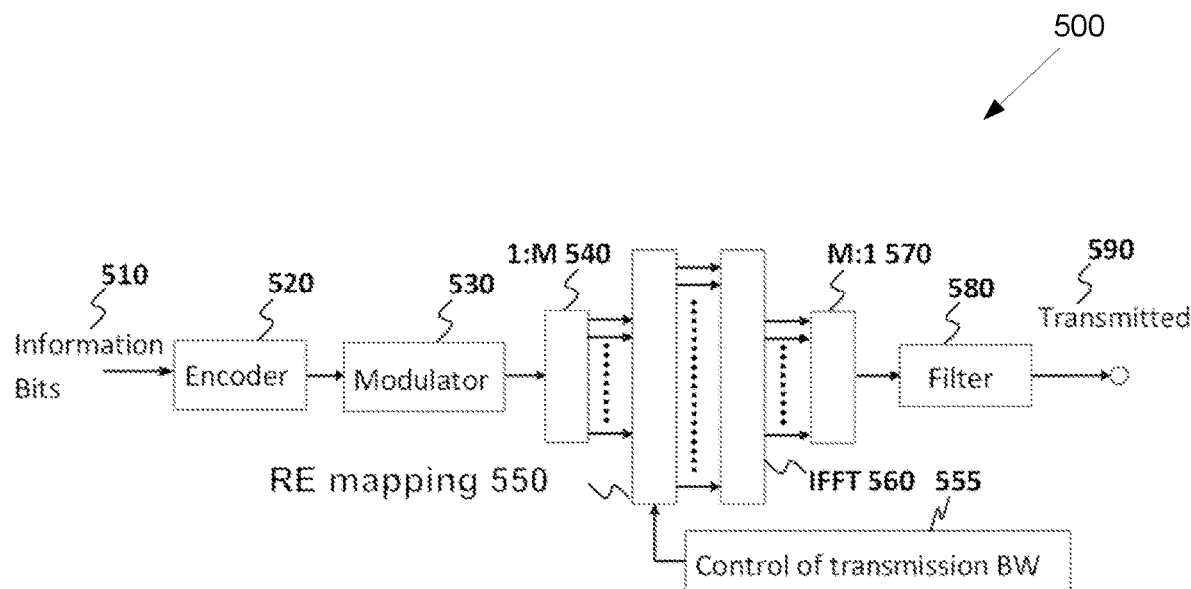
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
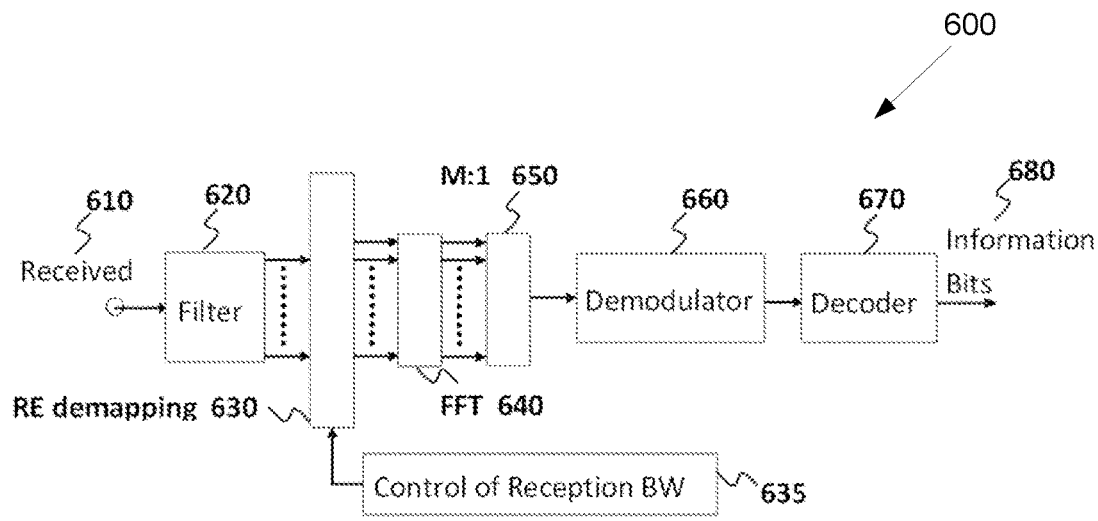
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
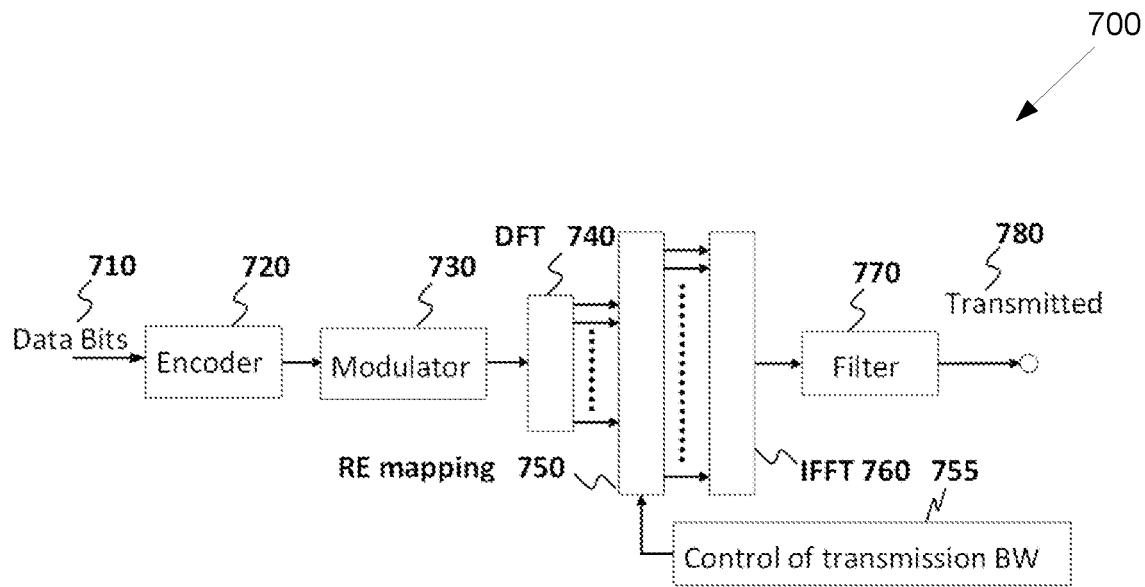
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
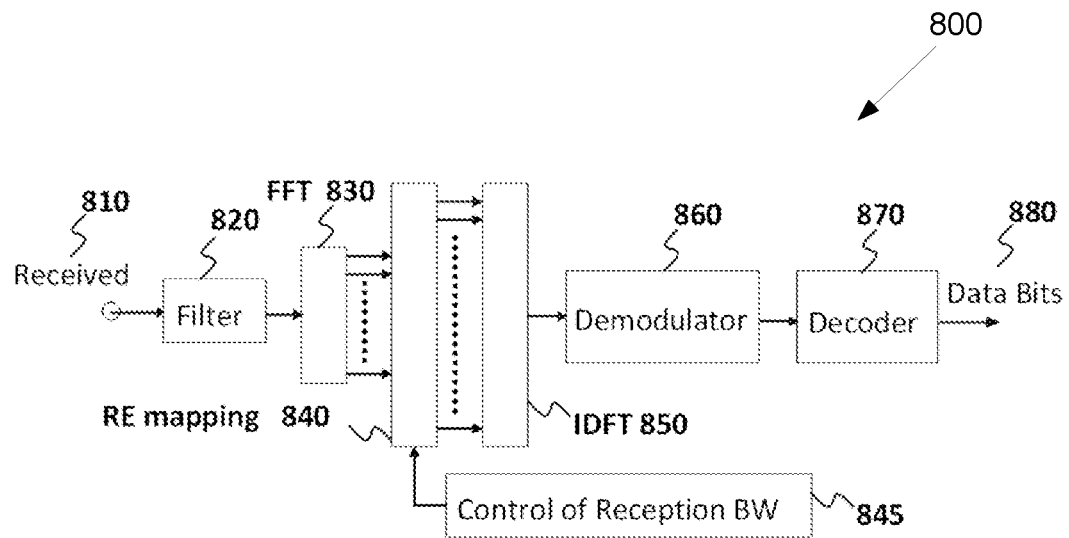
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
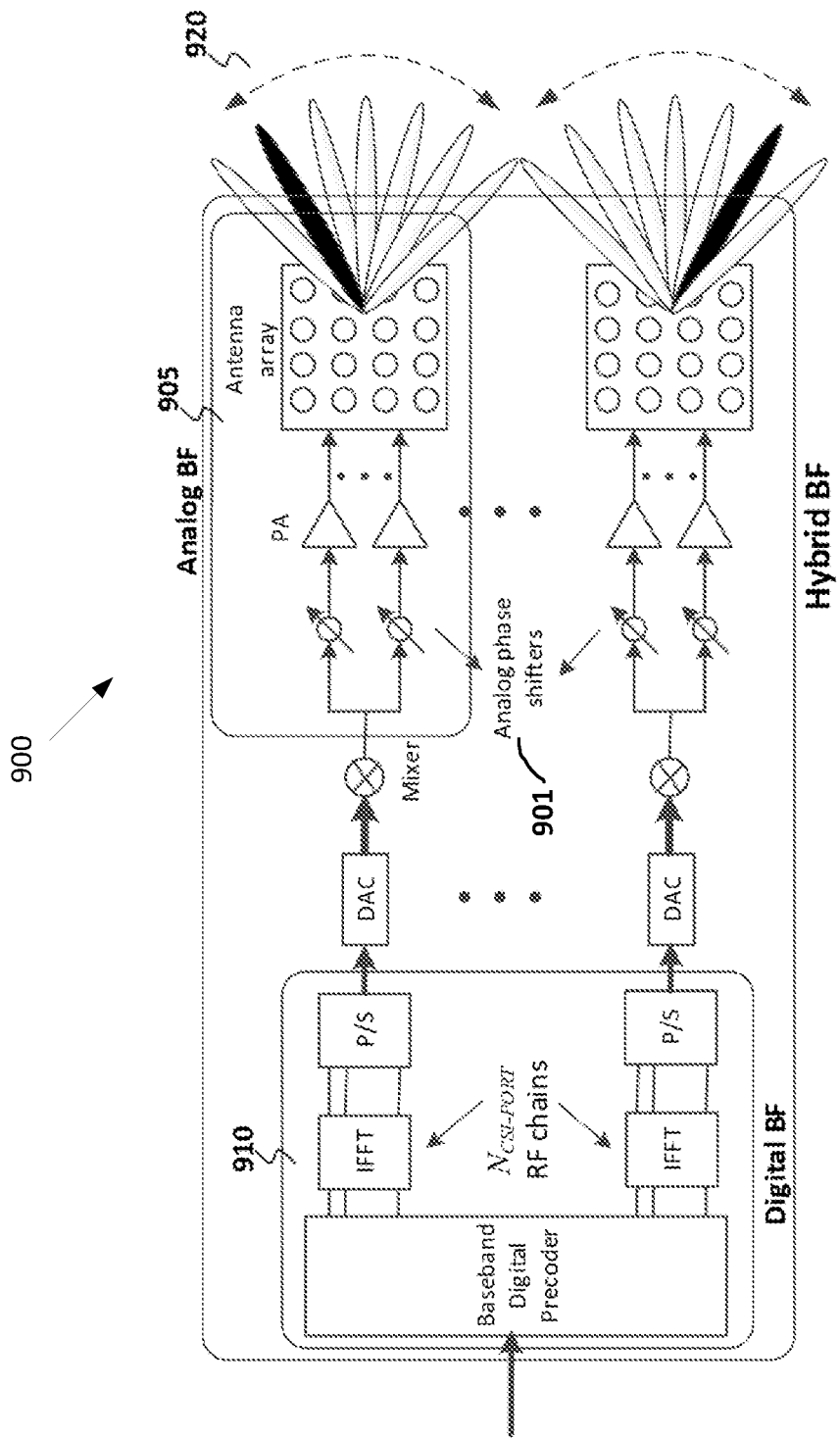
FIG. 9 illustrates an example multiplexing of two slices according to embodiments of the present disclosure.

FIG. 9 illustrates an example of beams 900 according to embodiments of the present disclosure. The embodiment of the beams 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the beams 900.

The 3GPP NR specification supports up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$ A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

In the 3GPP NR specification, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In the 3GPP NR specification, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, the 3GPP NR specification beam management becomes cumbersome and is unlikely able to keep up with more aggressive use cases which require large number of beams and fast beam switching (e.g., higher frequency bands, high mobility, and/or larger number of narrower analog beams). In addition, the 3GPP NR specification was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In one example, when beam correspondence is utilized, UL beam selection can be performed via measuring DL RS (CSI-RS and/or SSB) and CRI reporting accompanied with corresponding beam metrics (e.g., RSRP, SINR). That is, based on the CRI/RSRP or CRI/SINR reporting from the UE, the network (NW) can assume that the UE performs UL transmission on PUSCH with the UL TX beam associated with one of the latest CRI reports (especially the one with the highest RSRP or/SINR). Likewise, the UE can assume that the NW knows about this UE selection. Therefore, there is no need for a separate UL beam indication (e.g., via the SRI field or the UL-TCI field in the respective UL grant).

In the 3GPP NR specification, when beam correspondence is not utilized, UL beam selection can be performed via the NW selecting the UL TX beam and indicating it to the UE via the UL grant (signaled via SRI field or UL-TCI field—essentially indicating the UL TCI state associated with the UL TX beam). This selection is enabled by measuring the SRS transmitted from the UE (configured by the NW).

In either case, when an event that results in the UE having to select an (alternate) UL TX beam different from what the NW expects, some additional mechanisms are needed to ensure that (a) the UE has the alternate UL TX beam available when the UE detects such an event and the next UL TX beam indication can only in a later time slot, and (b) the NW is aware of the UE decision. A few examples of such an event are as follows.

In one example, such an event can happen due to the so-called Maximum Permissible Exposure (MPE) regulation, especially in North America, that restricts the UE transmission power in certain directions. That is, to prevent any excessive electromagnetic wave exposure on delicate soft tissues (e.g., brain tissues), the UE is to avoid transmitting high energy signal along some directions (e.g., toward the head). Unfortunately, such directions may correspond to the "best" UL TX beams (e.g., associated with the CRI of the highest reported RSRP/SINR, or associated with the SRS resource yielding the best measured SINR at the NW). When the "best" UL TX beams are not used for UL transmission, some loss of UL throughput (especially coverage) will occur.

In another example, such an event can happen due to hardware (HW) limitation at a UE equipped with multiple antenna panels, and in response to the event, the UE needs to select/switch antenna panel for UL transmission.

In yet another example, such an event can happen due to potential beam failure, and to avoid beam failure, the UE needs to select/switch antenna panel for UL transmission.

In yet another example, such an event can happen due to a sudden change in channel conditions (e.g., due to high speed, antenna/panel blockage, etc.) which may result in beam failure, and the UE needs to switch/change TX beam in order to continue UL transmission without interruptions/failures or having to wait for the next UL TX beam update/indication.

Therefore, there is a need for efficient designs for enabling UL TX beam selection in order to avoid outage (or beam failure), loss in UL throughput, loss in UL coverage, and issues related to HW, that may happen due to the events mentioned above. In this disclosure, several example embodiments are proposed for such designs.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of DL or UL TX beam, such as direction, precoding/beamforming, number of ports, etc. For instance, as the UE receives a reference RS index/ID in a DL assignment represented by a TCI state, the UE applies the known characteristics of the reference RS to the assigned DL transmission. In an alternative, the reference RS included in a TCI state is referred to as a source RS (e.g., to distinguish an RS included in a TCI state from an RS configured for beam measurement/reporting). The reference RS can be received and measured by the UE (in this case, the reference RS is a downlink signal such as NZP CSI-RS and/or SSB) with the result of the measurement used for calculating a beam report (in the 3GPP NR specification, at least one L1-RSRP accompanied by at least one CRI). As the NW/gNB receives the beam report, the NW can be better equipped with information to assign a particular DL TX beam to the UE. Optionally, the reference RS can be transmitted by the UE (in this case, the reference RS is a downlink signal such as SRS). As the NW/gNB receives the reference RS, the NW/gNB can measure and calculate the needed information to assign a particular DL TX beam to the UE. This option is applicable when DL-UL beam pair correspondence holds.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

There are two types of frequency range (FR) defined in 3GPP NR specifications. The sub-6 GHz range is called frequency range 1 (FR1) and millimeter wave range is called frequency range 2 (FR2). An example of the frequency range for FR1 and FR2 is shown below.

| Frequency range designation | Corresponding frequency range |
| --- | --- |
| FR1 | 450 MHz-6000 MHz |
| FR2 | 24250 MHz-52600 MHz |

The following embodiment is an example of DL multi-beam operation that utilizes DL beam indication after the network (NW) receives some transmission from the UE. In the first example embodiment, aperiodic CSI-RS is transmitted by the NW and measured by the UE. Although aperiodic RS is used in these two examples, periodic or semi-persistent RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "Resource Indicator", also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 10:
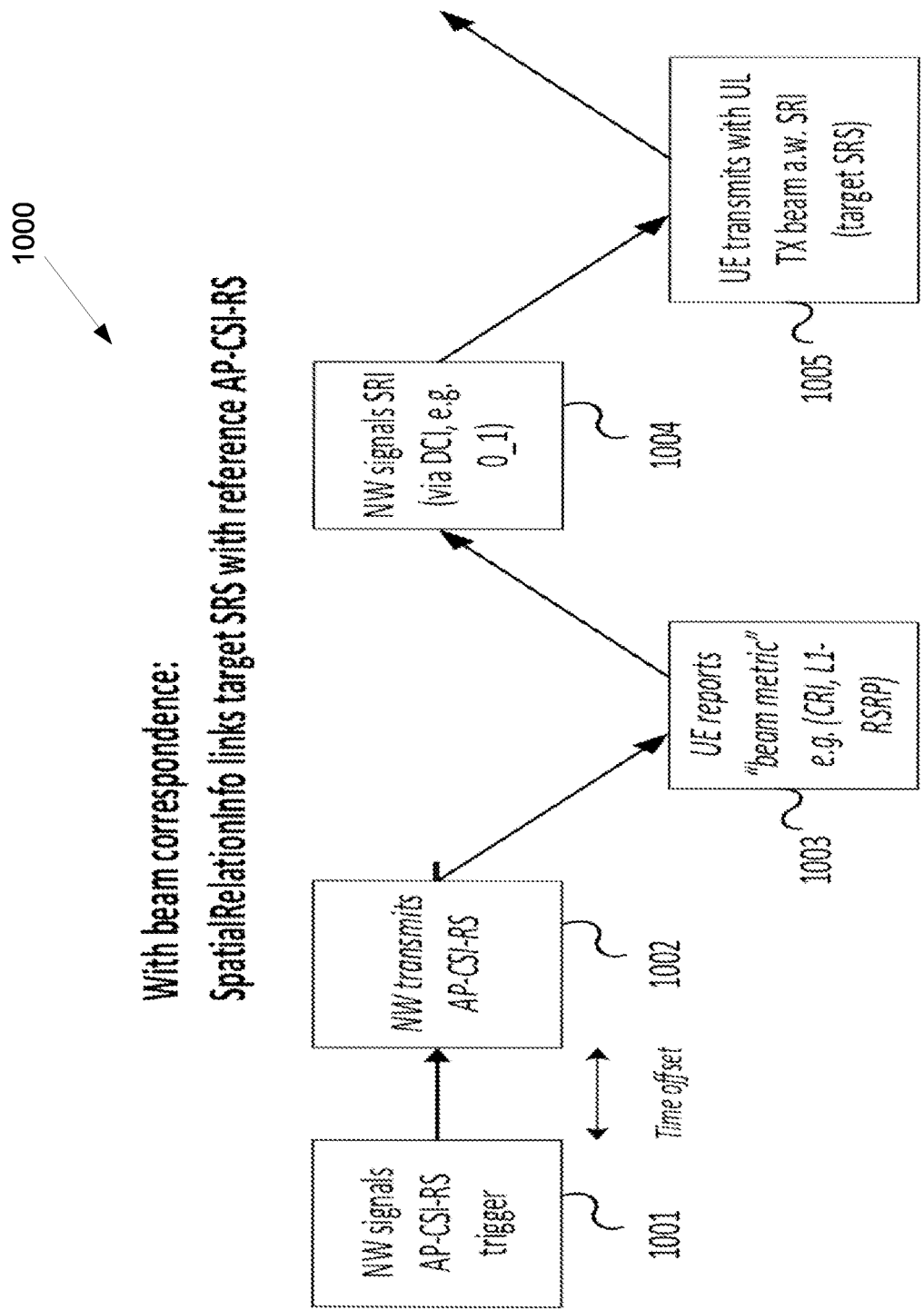
FIG. 10 illustrates an uplink multi-beam operation according to embodiments of the present disclosure.

In one example illustrated in FIG. 10, an UL multi-beam operation 1000 is shown. The embodiment of the UL multi-beam operation 1000 illustrated in FIG. 10 is for illustration only. FIG. 10 does not limit the scope of this disclosure to any particular implementation of the UL multi-beam operation 1000.

The UL multi-beam operation 1000 starts with starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 1004) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 1005).

Figure 11:
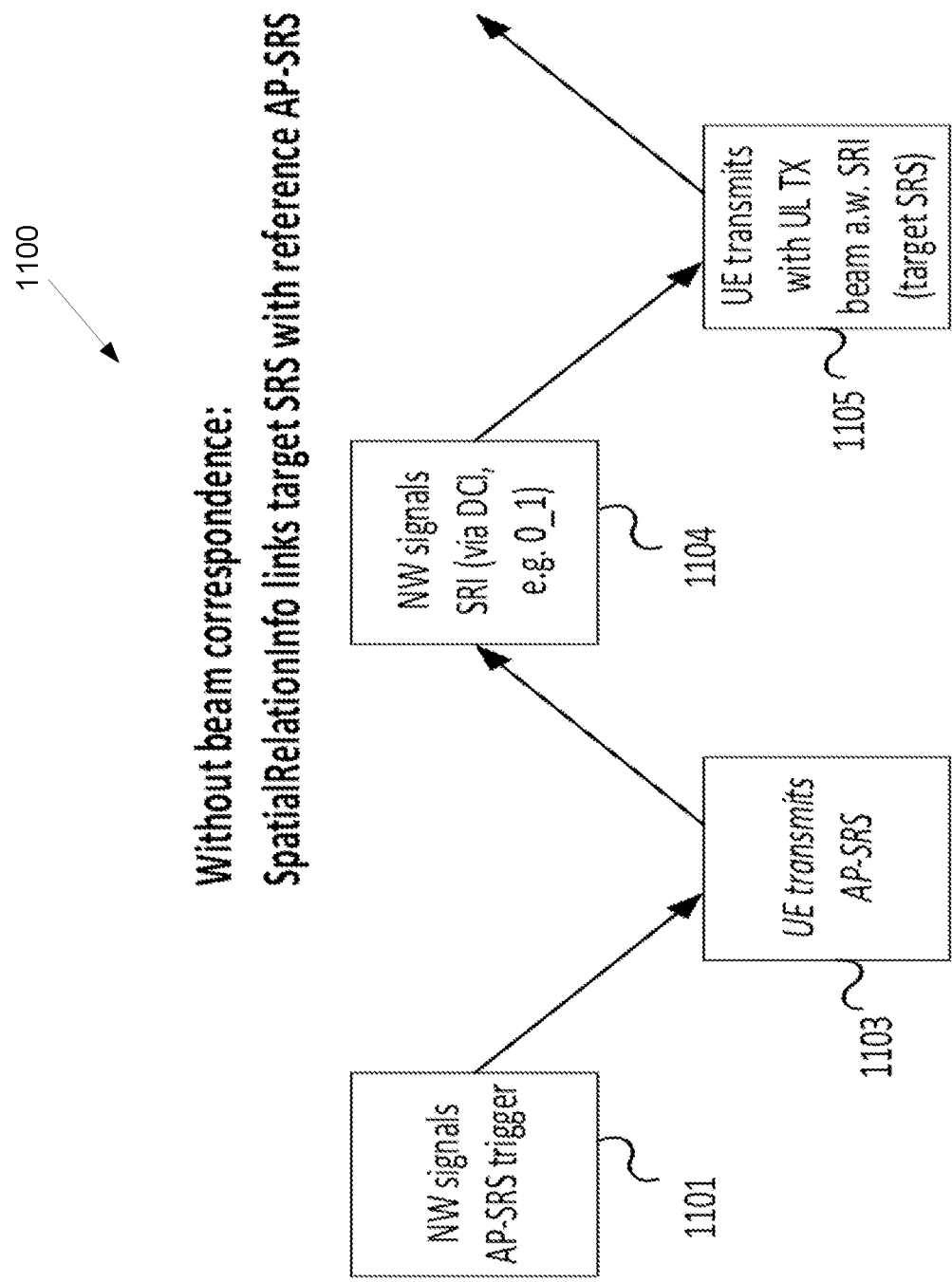
FIG. 11 illustrates an uplink multi-beam operation according to embodiments of the present disclosure.

In another example illustrated in FIG. 11, an UL multi-beam operation 1100 is shown. The embodiment of the UL multi-beam operation 1100 illustrated in FIG. 11 is for illustration only. FIG. 11 does not limit the scope of this disclosure to any particular implementation of the UL multi-beam operation 1100.

The UL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select an UL TX beam for the UE. The gNB/NW can then indicate the UL TX beam selection (step 1104) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 1105).

Figure 12:
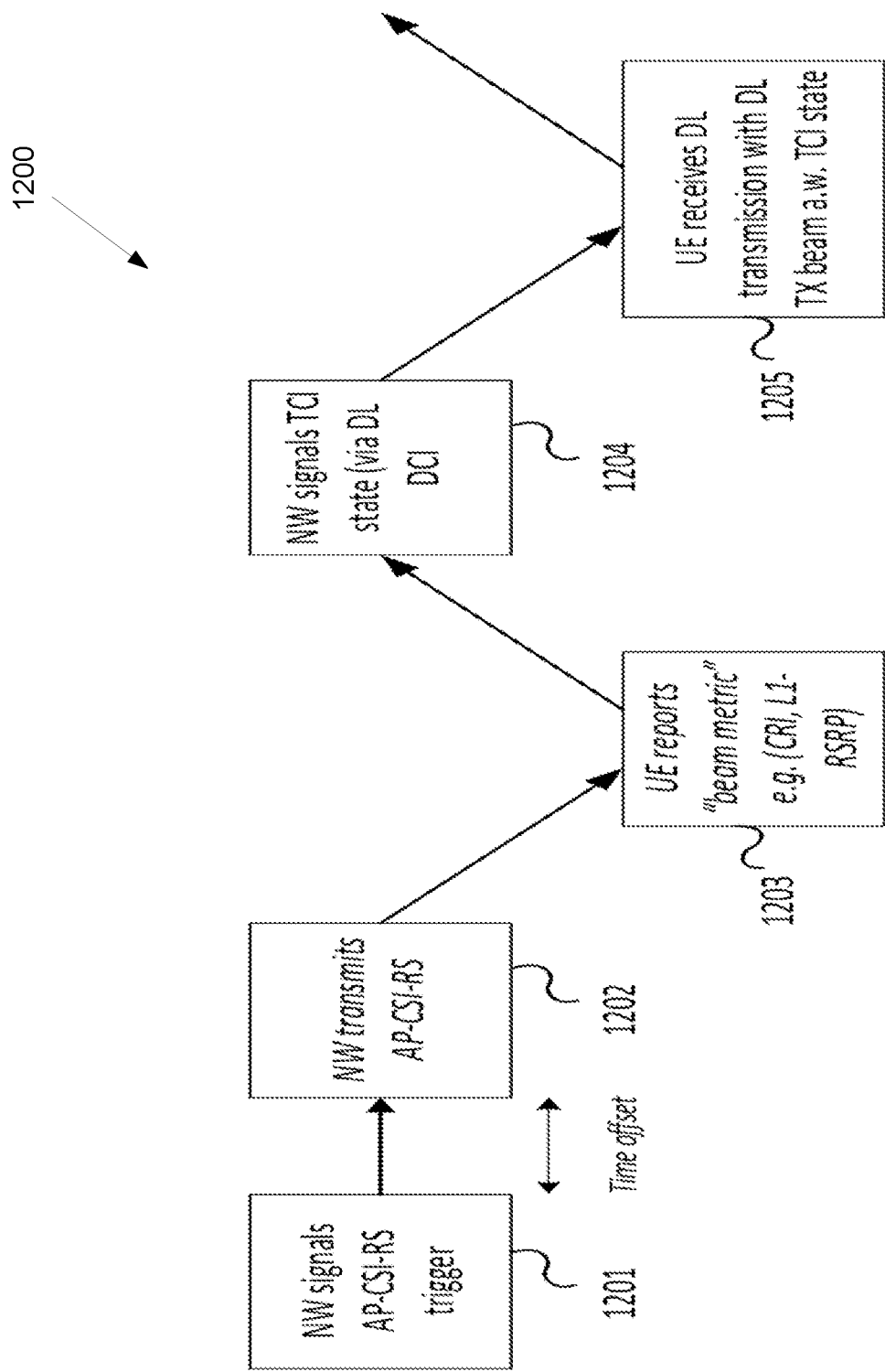
FIG. 12 illustrates a downlink multi-beam operation according to embodiments of the present disclosure.

In another example illustrated in FIG. 12, a DL multi-beam operation 1200 is shown. The embodiment of the DL multi-beam operation 1200 illustrated in FIG. 12 is for illustration only. FIG. 12 does not limit the scope of this disclosure to any particular implementation of the DL multi-beam operation 1200.

In the example illustrated in FIG. 12, where a UE is configured for measuring/receiving aperiodic CSI-RS (AP-CSI-RS) and reporting aperiodic CSI (AP CSI), a DL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1202), the UE measures the AP-CSI-RS and, in turn, calculates and reports a "beam metric" (included in the CSI, indicating quality of a particular TX beam hypothesis) (step 1203). Examples of such beam reporting (supported in the 3GPP NR specification) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 1204) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 1205). In this example embodiment, only one DL TX beam is indicated to the UE.

In the above two example embodiments illustrated in FIGS. 10 and 11, only one UL TX beam is indicated to the UE. The SRI used in embodiments illustrated in FIGS. 10 and 11 can also be replaced with UL-TCI wherein an UL-TCI field can be introduced in the pertinent UL-related DCI(s), either in place of or in addition to the SRI field in the 3GPP NR specification.

The aperiodic CSI-RS (along with the associated aperiodic reporting) in the embodiment illustrated in FIG. 10 and the aperiodic SRS in the embodiment illustrated in FIG. 1100 can be substituted with that of another time-domain behavior such as semi-persistent (SP) or periodic (P).

In any of the embodiments or sub-embodiments or examples below, a flowchart is used for illustrative purposes. The present disclosure covers any possible variation of the flowchart as long as at least some of the components are included. Such components include the UL TX beam indication indicating multiple UL TX beams and the event-dependent UL TX beam switch from the indicated multiple UL TX beams.

In the rest of the disclosure, the term "beam", can be associated with a spatial transmission/reception of a resource signal (RS) from a "port", "antenna port", or "virtual antenna/port". Likewise, the term "transmit (TX) beam", can be associated with a spatial transmission of a resource signal (RS) or a channel from a "port", "antenna port", or "virtual antenna/port"; and the term "receive (RX) beam", can be associated with a spatial reception of a resource signal (RS) or a channel from a "port", "antenna port", or "virtual antenna/port". The spatial transmission/reception of a beam can be in a three-dimension (3D) space. In a beam-formed wireless system, the transmission and reception of wireless signal can be via multiple TX and multiple RX beams.

The present disclosure includes the following components for efficient designs for enabling UL TX beam selection procedures.

Component 1—UE Procedures for UL TX Beam Selection Assuming Beam Correspondence

In the first component, example embodiments for the UL TX beam selection are provided for the case when beam correspondence between DL and UL holds, wherein the selection/indication of the UL TX beam for UL transmission is based on DL RS measurement and beam reporting.

UE-Recommendation

Figure 13:
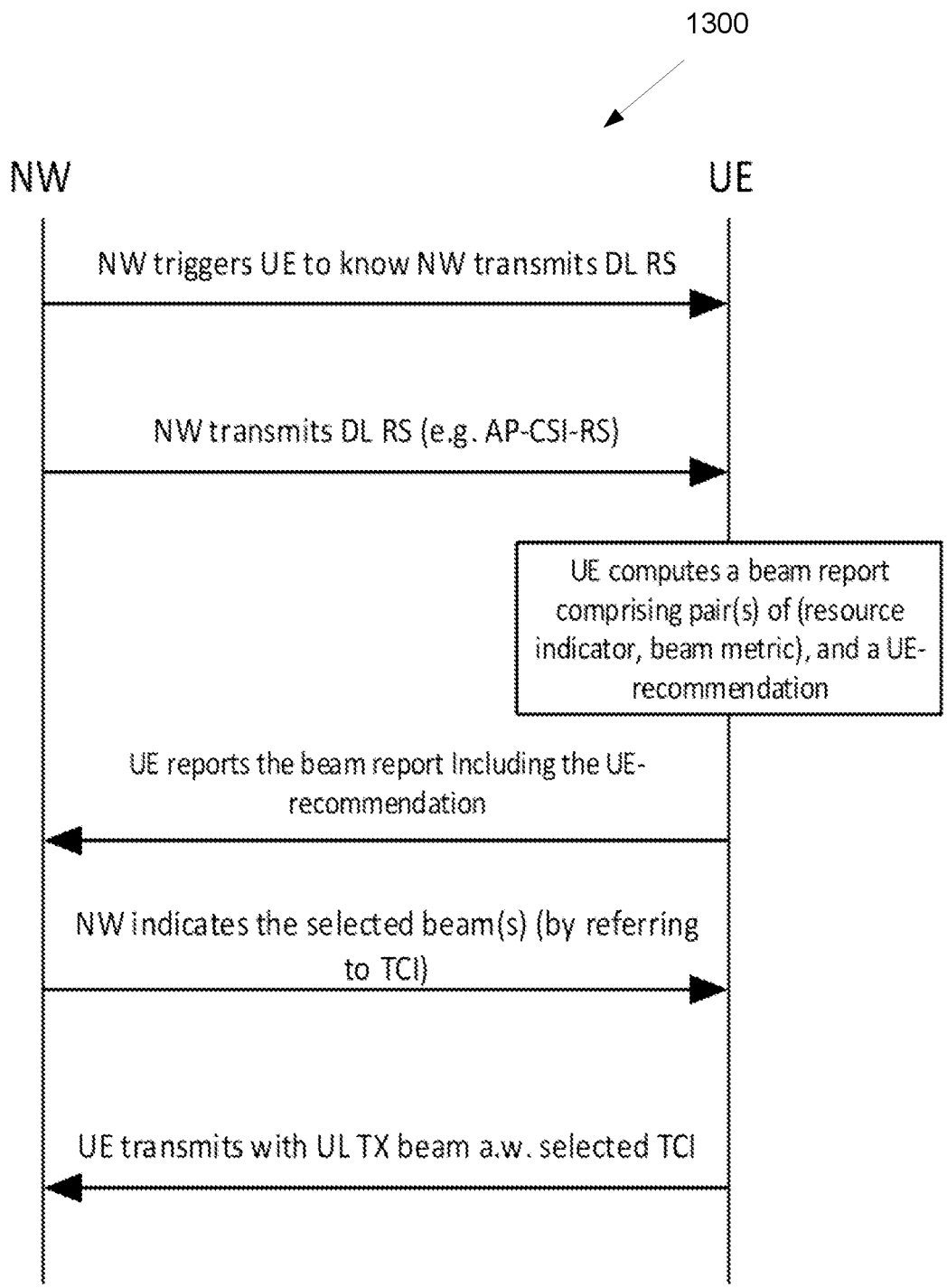
FIG. 13 illustrates a flow diagram illustrating a UE configured to measure DL measurement RS resources and report a beam report including a UE-recommendation according to embodiments of the present disclosure.

In one embodiment (I.1) illustrated in FIG. 13, a flow diagram illustrating a UE configured to measure DL measurement RS resources and report a beam report including a UE-recommendation 1300 is shown. The embodiment of the UE configured to measure DL measurement RS resources and report a beam report including a UE-recommendation 1300 illustrated in FIG. 13 is for illustration only. FIG. 13 does not limit the scope of this disclosure to any particular implementation of the UE configured to measure DL measurement RS resources 1300.

As shown in FIG. 13, a UE is configured (by the NW/gNB) to measure (receive) $P_1$ DL measurement RS resources (such as CSI-RS or SSB), where $P_1 \geq 1$. This configuration can be performed via higher-layer (RRC) signaling. Optionally, the NW/gNB can signal/update the (sub)set of DL measurement RS resources dynamically via L1 or L2 DL control (PDCCH or MAC CE). These resources are used by the UE to perform beam measurement along different beams or spatial directions (represented by the beamforming/precoding operation performed at the NW/gNB transparent to the UE).

The UE is further configured (by the NW/gNB) to report a beam report, wherein the beam report includes $Q_1$ resource indicators (I) or $Q_1$ pairs of (I,J)=(resource indicator, beam metric), where $Q_1 \leq P_1$. In one example, $Q_1 = 1$. In one example, $Q_1$ is configured via RRC and/or MAC CE. The beam metric can represent link quality associated with the DL channel (or UL channel since beam correspondence holds). Examples of beam metric include L1-RSRP, L1-SINR, CQI, or hypothetical BLER, or any other beam metric. The resource indicator indicates a DL measurement RS resource index from the $P_1$ DL measurement RS resources. Examples of resource indicator include CRI (when DL measurement RS is CSI-RS) and SSB-RI (when DL measurement RS is SSB).

In one example, when the UE is equipped with $X > 1$ antenna panels, $Q_1 = X$, and one resource indicator (I) or pair of (I,J)=(resource indicator, beam metric) is reported for each antenna panel. In one example, when the UE is equipped with $X > 1$ antenna panels, $Q_1 \geq X$, and at least one resource indicator (I) or pair of (I,J)=(resource indicator, beam metric) is reported for each antenna panel. The set of $P_1$ DL measurement RS resources can be partitioned into X subsets, one subset for each antenna panel. Alternatively, the $P_1$ DL measurement RS resources is a super-set encompassing X sets, one set for each antenna panel. In one example, the information about X panels is not provided to the NW/gNB. In one example, the information about X panels is provided to the NW/gNB. For instance, the information about the panel ID can be included/reported implicitly, e.g., from the resource indicators (I). Alternatively, the information about the panel ID can be included/reported explicitly, e.g., by including/reporting the panel ID(s) in the beam report.

In addition to $Q_1$ resource indicators (I) or $Q_1$ pairs of (I,J)=(resource indicator, beam metric), the beam report can also include a UE-recommendation for UL TX beam selection/indication (by the NW/gNB). The time-domain behavior of this beam measurement and/or beam reporting can be configured as aperiodic (AP), semi-persistent (SP), or periodic (P). The time-domain behavior of the beam measurement RS can be configured as aperiodic (AP), semi-persistent (SP), or periodic (P).

The UE-recommendation can be reported jointly with the other components included in the beam report using a joint parameter (or indicator). For example, the UE-recommendation can be reported jointly with at least one of the resource indicators. Alternatively, the UE-recommendation can be reported jointly with at least one of the beam metrics. Alternatively, the UE-recommendation can be reported jointly with at least one of the pairs (resource indicator, beam metric).

Alternatively, the UE-recommendation can be reported separately (independently) from the other components in the beam report using a separate parameter (or indicator). The reporting configuration can be joint (one configuration) or separate (two configurations), one for UE-recommendation and another for the other components in the beam report.

Alternatively, the reporting of the UE-recommendation and the other components in the beam report are decoupled, i.e., one reporting for the UE-recommendation and another reporting for the other components in the beam report. The reporting configuration can be joint (one configuration) or separate (two configurations), one for UE-recommendation and another for the other components in the beam report.

Note that the UE-recommendation may not be limited to any specific event (such as MPE), it is rather general and is hence applicable to any event of interests for the UE such as MPE mitigation, fast panel selection, fast beam switch, avoiding beam failure (as described above).

In one sub-embodiment (I.1.1), the content of the UE-recommendation is determined (or configured) according to at least one of the following examples.

In one example (I.1.1.1), the UE-recommendation comprises $Q_2$ additional (beam) resource indicator(s). In one example, $Q_2$ is fixed, for example, to $Q_2=1$. In one example, $Q_2$ is configured. In one example, $Q_2$ is reported by the UE, for example, as part of the beam report (i.e., UE-recommendation). In one example, a UE can report a $Q_2$ value of zero, and in another example, a UE can report a non-zero (positive) value of $Q_2$. In another example, the UE can be configured with a maximum value (v) for $Q_2$, and the UE can a report any $Q_2$ value such that $Q_2 \in \{1, 2, \ldots, v\}$ or $\{0, 1, 2, \ldots, v\}$.

In one example (I.1.1.2), the UE-recommendation comprises $Q_2$ additional pairs of (I,J)=(resource indicator, beam metric). In one example, $Q_2$ is fixed, for example, to $Q_2=1$. In one example, $Q_2$ is configured. In one example, $Q_2$ is reported by the UE, for example, as part of the beam report (i.e., UE-recommendation). In one example, a UE can report a $Q_2$ value of zero, and in another example, a UE can report a non-zero (positive) value of $Q_2$. In another example, the UE can be configured with a maximum value (v) for $Q_2$, and the UE can a report any $Q_2$ value such that $Q_2 \in \{1, 2, \ldots, v\}$ or $\{0, 1, 2, \ldots, v\}$.

In one example (I.1.1.3), the UE-recommendation comprises an ID, where the ID can be associated with a subset of DL measurement RS resources. In one example, the set of $P_1$ DL measurement RS resources can be partitioned into X subsets, and the x-th subset includes $M_x$ DL measurement RS resources such that $P_1=\Sigma_{x=1}^{X}M_x$. The ID (e.g., subset ID) indicates one of the X subsets. In one example, the $P_1$ DL measurement RS resources is a super-set encompassing X sets, and the x-th set includes $M_x$ DL measurement RS resources such that $P_1=\Sigma_{x=1}^{X}M_x$. The ID (e.g., set ID) indicates one of the X sets. In one example, the ID can be associated with an antenna panel of the UE (e.g., panel ID) that is equipped with multiple antenna panels.

In one example (I.1.1.4), the UE-recommendation comprises an ID and $Q_2$ additional (beam) resource indicator(s), where the ID is according to the description in example 1.1.3, and $Q_2$ additional (beam) resource indicator(s) is (are) according to the description in example I.1.1. In one example, the $Q_2$ additional (beam) resource indicator(s) can be associated with (dependent or derived from or based on) the ID. In one example, the $Q_2$ additional (beam) resource indicator(s) can be independent of the ID.

In one example (I.1.1.5), the UE-recommendation comprises an ID and $Q_2$ additional pairs of (I,J)=(resource indicator, beam metric), where the ID is according to the description in example I.1.3, and $Q_2$ additional pairs of (I,J)=(resource indicator, beam metric) according to the description in example I.1.2.

In one sub-embodiment (I.1.2), the reporting of the UE-recommendation can be determined (or configured) according at least one of the following examples.

In one example (I.1.2.1), the UE-recommendation can always be included the beam report (i.e., reported by the UE).

In one example (I.1.2.2), the UE-recommendation can always be included the beam report (i.e., reported by the UE) when a condition is met, wherein, for example, the condition being that the UE is equipped with multiple antenna panels, or that the UE reports this (the UE-recommendation) as part of its UE capability, or that an event of interest can be detected by the UE.

In one example (I.1.2.3), the reporting of the UE-recommendation can be configured (turned ON/OFF), for example, via RRC and/or MAC CE and/or DCI. When configured (turned ON), the UE-recommendation is always included in the beam report.

In one example (I.1.2.4), the UE decides (has the freedom to decide) whether the UE-recommendation is included in the beam report, i.e., the UE may or may not include the UE-recommendation in the beam report. For instance, such a decision can be made based on the event of interest. In one example, the beam report (with or without the UE-recommendation) is reported via a one-part UCI (similar to WB CSI reporting in Rel. 15 NR, the UE can append a fixed number of zeros in order to ensure that the payload remains the same regardless of whether the UE reports the UE-recommendation or not). In one example, the beam report (with or without the UE-recommendation) is reported via a two-part UCI, wherein part 1 UCI includes an information whether the UE reports the UE-recommendation or not. If the information indicates the UE-recommendation being reported, it is reported via part 2 UCI.

In one example (I.1.2.5), the capability of reporting of the UE-recommendation is reported by the UE (e.g., via UE capability reporting or as part of an UL transmission). Depending on the reported UE capability, the NW/gNB can configure (or trigger) the reporting of the UE-recommendation via RRC and/or MAC CE (and/or DCI). The UE reports the UE-recommendation according to the configuration/triggering from the NW/gNB.

Upon receiving the beam report, the NW/gNB configures/indicates the UL TX beam indication (which can be the same as DL TX beam indication since beam correspondence holds) to the UE for UL transmission, where the beam indication indicates (A) a message, or (B) $N \geq 1$ UL TX beam(s), or (C) both a message and $N \geq 1$ UL TX beam(s). The beam indication can be via DL-TCI or UL-TCI or J-TCI (joint TCI) or other functionally equivalent entity such as SpatialRelationInfo or SRI that is indicated via DCI and/or MAC CE and/or RRC. In one example N=1. In one example, N=2.

In one sub-embodiment (I.1.3), when the beam report does not include the UE-recommendation, the beam indication is determined (or configured) according to at least one of the following examples.

In one example (I.1.3.1), when $Q_1=1$ resource indicator is included in the beam report, the beam indication can only indicate (A) a message, where the message corresponds to an ACK message indicating that the N=1 UL TX beam corresponds to the $Q_1$ resource indicator included in the beam report. Some of the details of the ACK message can be according to the same described in embodiment I.4.

In one example (I.1.3.2), when $Q_1=1$ resource indicator is included in the beam report, the beam indication can indicate (A) a message or (B) N≥1 UL TX beam(s), where for (A), the message corresponds to an ACK message indicating that the N=1 UL TX beam corresponds to the $Q_1$ resource indicator included in the beam report, and for (B), the N≥1 UL TX beam(s) is (are) based on the $P_1$ DL measurement RS resources measured by the UE. Some of the details of the ACK message can be according to the same described in embodiment I.4.

In one example (I.1.3.3), the beam indication can only indicate (B) N≥1 UL TX beam(s), where the N≥1 UL TX beam(s) is (are) based on the $P_1$ DL measurement RS resources measured by the UE.

In one sub-embodiment (I.1.4), when the beam report includes the UE-recommendation, the NW/gNB can acknowledge to the UE whether it follows the UE-recommendation or not, and accordingly, the beam indication is determined (or configured) according to at least one of the following examples. Some of the details of the ACK message can be according to the same described in embodiment I.4.

In one example (I.1.4.1), the NW/gNB follows the UE-recommendation and the beam indication comprises (A) an ACK message to the UE. The NW/gNB may not indicate (B) N≥1 UL TX beam(s) in this case. Alternatively, the NW/gNB may indicate (B) N≥1 UL TX beam(s). Alternatively, whether the NW/gNB indicates (B) N≥1 UL TX beam(s) or not may depend on the UE-recommendation. For example, when the UE-recommendation includes $Q_2=1$ additional (beam) resource indicator (cf. example I.1.1.1 and I.1.1.2), the NW/gNB doesn't indicate (B).

In one example (I.1.4.2), the NW/gNB does not follow the UE-recommendation, it either doesn't send the ACK message or sends a NACK/NULL message to the UE. The NW/gNB indicates the beam indication comprising (B) N≥1 UL TX beam(s). The beam indication can be based on the $Q_1$ resource indicators included in the beam report. Alternatively, the beam indication can be based on the $Q_1$ resource indicators included in the beam report, and if included in the UE-recommendation, also based on the $Q_2$ resource indicators.

In an example, the NW/gNB signals the ACK message included in the beam indication only when the UE-recommendation is provided (reported) by the UE.

In one sub-embodiment (I.1.5), the signaling the ACK (or NACK/NULL) message to the UE is determined (or configured) according to at least one of the following examples. Some of the details of the ACK message can be according to the same described in embodiment I.4.

In one example (I.1.5.1), the signaling of the ACK message is via a dedicated (separate) parameter or field. The dedicated parameter or field can be indicated via a DCI, where the DCI can be a UL-DCI (scheduling UL grant), or DL-DCI (scheduling DL transmission), or a separate DCI for the beam (TCI state) indication (UL-TCI-DCI or DL-TCI-DCI or TCI-DCI). Alternatively, the dedicated parameter or field can be indicated via channel other than DCI (e.g., PDSCH or MAC CE). In one example, the dedicated field corresponds to a 1-bit indication, where a bit value 0 indicates the ACK message (and, optionally, 1 indicates the NACK/NULL message), or vice versa, i.e., 1 indicates the ACK message (and, optionally, 0 indicates the NACK/NULL message). In one example, the dedicated parameter can take one of a value v0 indicating the ACK message (and, optionally a value v1 indicating the NACK/NULL message).

In one example (I.1.5.2), the signaling of the ACK message is joint with a parameter or field, which can be indicated via a DCI or a channel other than DCI, as described above. In one example, the field corresponds to a B-bit indication, where when the B-bit indication equals a fixed bit sequence $b_0 b_1 \ldots b_{B-1}$, it indicates the ACK message. In one example, the fixed bit sequence is all-zero, i.e., $b_0 b_1 \ldots b_{B-1}=00 \ldots 0$. In one example, the fixed bit sequence is all-one, i.e., $b_0 b_1 \ldots b_{B-1}=11 \ldots 1$. For example, when B=3, i.e., a 3-bit indication is used for the beam indication, the code point 000 (or 111) can be used to indicate the ACK message. The remaining bit sequence values can be used indicate other DL or UL related parameter (such as N≥1 UL TX beam indication when the gNB/NW does not signal the ACK message).

In one example (I.1.5.3), the signaling of the ACK (or NACK/NULL) message is configured (turned ON/OFF) to the UE via RRC and/or MAC CE. When configured (turned ON), the signaling is performed according to at least one of examples I.1.5.1 and I.1.5.2. Some of the details of the ACK message can be according to the same described in embodiment I.4.

In one example, the field (code point) value or the parameter value for the ACK (or NULL/NACK) message is reserved and can't be used for other purpose regardless of whether the UE is configured to report the ACK (or NULL/NACK) message or not.

In one example, when configured (turned ON), the field (code point) value or the parameter value for the ACK (or NULL/NACK) message is used for indicating the ACK (or NULL/NACK) message, otherwise (turned OFF), it is used for indicating other DL or UL related parameter (such as N≥1 UL TX beam indication when the gNB/NW does not signal the ACK message).

In one sub-embodiment (I.1.6), a UE provides two sets of reports, either with a same report or separately in two different reports, wherein;
A first report (sub-report) is a beam report including resource indicator(s) and possibly beam metrics, without reflecting the UE's recommendation.
A second report (sub-report) is a beam report including resource indicator(s) and possibly beam metrics, reflecting the UE's recommendation.

In one example, this behavior is configurable/triggered to the UE via RRC and/or MAC CE and/or DCI. When configured, the UE provides two reports (sub-reports), else it provides one report (the first report). In one example, the configuration and/or triggering is UE-specific, in another example, the configuration and/or triggering is UE-group specific, and in another example, the configuration and/or triggering is cell-specific.

In one sub-embodiment (I.1.7), a UE is configured to report the UE-recommendation, as described above (and elsewhere in this disclosure), wherein its reporting is subject to a restriction. At least one of the following examples or a combination of multiple of the following examples is used (or configured) as the restriction.

In one example (I.1.7.1), the restriction is on the resource type. The resource type can be CSI-RS or SSB for the beam report (including $Q_1$ resource indicators or $Q_1$ pairs of resource indicator and beam metric). However, for the UE-recommendation, it can be according to at least one of the following examples.

- In one example, the resource type can be CSI-RS or SSB for the UE-recommendation (including Q2 resource indicators or Q2 pairs of resource indicator and beam metric).
- In one example, the resource type can be CSI-RS for the UE-recommendation (including Q2 resource indicators or Q2 pairs of resource indicator and beam metric).
- In one example, the resource type can be SSB for the UE-recommendation (including Q2 resource indicators or Q2 pairs of resource indicator and beam metric).

In one example (I.1.7.2), the restriction is based on the value of $Q_1$. At least one of the following examples can be used.

- In one example, the UE-recommendation can only be reported when $Q_1=1$, i.e., the reporting of one resource indicator (e.g., CRI or SSBRI) or one pair of resource indicator and beam metric (e.g., CRI/SSB-RI+RSRP/SINR) is configured. The UE-recommendation can include CRI/SSB-RI (or CRI/SSBRI+RSRP/SINR) associated (or QCL-ed) with UL TX beams that should be used even if they do not correspond to the beams with the largest RSRP/SINR.
- In one example, the UE-recommendation can only be reported when $Q_1=2$, i.e., the reporting of two resource indicators (e.g., CRIs or SSBRIs) or two pairs of resource indicator and beam metric (e.g., CRI/SSB-RI+ RSRP/SINR) is configured. The UE-recommendation can include CRI/SSB-RI (or CRI/SSBRI+RSRP/SINR) associated (or QCL-ed) with UL TX beams that should be used even if they do not correspond to the beams with the largest RSRP/SINR.
- In one example, the UE-recommendation can only be reported when $Q_1=1$ or 2, i.e., the reporting of one or two resource indicators (e.g., CRI or SSBRI) or one or two pairs of resource indicator and beam metric (e.g., CRI/SSB-RI+RSRP/SINR) is configured. The UE-recommendation can include CRI/SSB-RI (or CRI/ SSBRI+RSRP/SINR) associated (or QCL-ed) with UL TX beams that should be used even if they do not correspond to the beams with the largest RSRP/SINR.

In one example (I.1.7.3), the beam reporting including $Q_1$ beam reports remains the same regardless of whether the UE-recommendation is reported or not, since it can be used for DL and/or UL (e.g., for beam indication for DL reception and/or UL transmission). However, the UE-recommendation when reported is used only for UL (e.g., for beam indication for UL transmission).

Reporting MPE Condition

Figure 14:
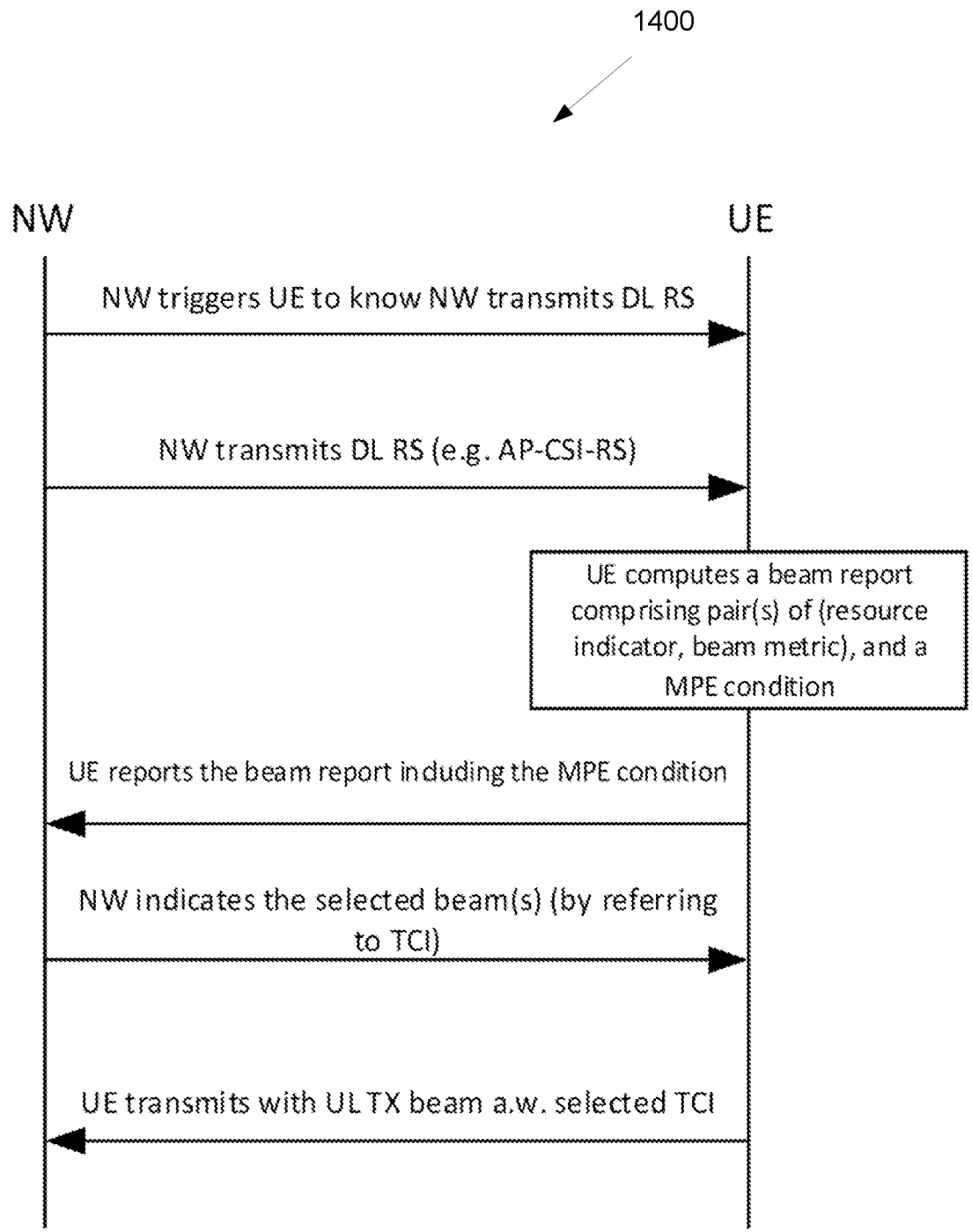
FIG. 14 illustrates a flow diagram illustrating a UE configured to measure DL measurement RS resources and report a beam report including a MPE condition according to embodiments of the present disclosure.

In one embodiment (I.2) illustrated in FIG. 14, a flow diagram illustrating a UE configured to measure DL measurement RS resources and report a beam report including a MPE condition 1400 is shown. The embodiment of the UE configured to measure DL measurement RS resources and report a beam report including a MPE condition 1400 illustrated in FIG. 14 is for illustration only. FIG. 14 does not limit the scope of this disclosure to any particular implementation of the UE configured to measure DL measurement RS resources 1400.

As shown in FIG. 14, a UE is configured (by the NW/gNB) to measure (receive) $P_1$ DL measurement RS resources (such as CSI-RS or SSB), where $P_1 \geq 1$, and the details about this measurement are as described in embodiment I.1.

The UE is further configured (by the NW/gNB) to report a beam report, wherein the beam report includes $Q_1$ resource indicators (I) or $Q_1$ pairs of (I,J)=(resource indicator, beam metric), where $Q_1 \leq P_1$, and resource indicator and beam metric are according to the examples described in embodiment I.1. In addition to $Q_1$ resource indicators (I) or $Q_1$ pairs of (I,J)=(resource indicator, beam metric), the beam report can also include an information about the MPE condition. The time-domain behavior of this beam measurement and/or beam reporting can be configured as aperiodic (AP), semi-persistent (SP), or periodic (P). The time-domain behavior of the beam measurement RS can be configured as aperiodic (AP), semi-persistent (SP), or periodic (P).

The MPE condition can be reported jointly with the other components included in the beam report using a joint parameter (or indicator). For example, the MPE condition can be reported jointly with at least one of the resource indicators. Alternatively, the MPE condition can be reported jointly with at least one of the beam metrics. Alternatively, the MPE condition can be reported jointly with at least one of the pairs (resource indicator, beam metric).

Alternatively, the MPE condition can be reported separately (independently) from the other components in the beam report using a separate parameter (or indicator). The reporting configuration can be joint (one configuration) or separate (two configurations), one for MPE conditions(s) and another for the other components in the beam report.

Alternatively, the reporting of the MPE condition and the other components in the beam report are decoupled, i.e., one reporting for the MPE condition and another reporting for the other components in the beam report. The reporting configuration can be joint (one configuration) or separate (two configurations), one for MPE conditions(s) and another for the other components in the beam report.

In one example, when the UE is equipped with X>1 antenna panels, $Q_1=X$, and one resource indicator (I) or pair of (I,J)=(resource indicator, beam metric) is reported for each antenna panel. In one example, when the UE is equipped with X>1 antenna panels, $Q_1 \geq X$, and at least one resource indicator (I) or pair of (I,J)=(resource indicator, beam metric) is reported for each antenna panel. The set of $P_1$ DL measurement RS resources can be partitioned into X subsets, one subset for each antenna panel. Alternatively, the $P_1$ DL measurement RS resources is a super-set encompassing X sets, one set for each antenna panel. In one example, the information about X panels is not provided to the NW/gNB. In one example, the information about X panels is provided to the NW/gNB. For instance, the information about the panel ID can be included/reported implicitly, e.g., from the resource indicators (I). Alternatively, the information about the panel ID can be included/reported explicitly, e.g., by including/reporting the panel ID(s) in the beam report.

For X>1 antenna panels at the UE, the MPE condition can be reported independently for each panel. Alternatively, the MPE condition can be reported for one of the X panels (e.g., the panel that has the worst MPE issue), and can also include a corresponding panel ID optionally. Alternatively, the MPE condition can be reported for all panels that have MPE issue. If there is no MPE issue detected, the UE does not report the MPE condition, otherwise, the UE reports the MPE condition for all panels having the MPE issue, and can also report the corresponding panels ID(s) optionally.

For X>1 subsets (or sets) of DL measurement RS resources, the MPE condition can be reported independently for each subset (or set). Alternatively, the MPE condition can be reported for one of the X subsets (or sets), e.g., the subset or the set that has the worst MPE issue, and can also include a corresponding subset (or set) ID optionally. Alternatively, the MPE condition can be reported for all subsets (or sets) that have MPE issue. If there is no MPE issue detected, the UE does not report the MPE condition, otherwise, the UE reports the MPE condition for all subsets (or sets) having the MPE issue, and can also report the corresponding subset (or set) ID(s) optionally.

In one sub-embodiment (I.2.1), the content or information conveyed by the MPE condition is determined (or configured) according to at least one of the following examples.

In one example (I.2.1.1), the information indicates whether MPE issue is detected by the UE or not. For example, the information can be conveyed via a 1-bit field, where the field value=0 (or 1) indicates that the MPE issue is not detected, and the field value=1 (or 0) indicates that the MPE issue is detected.

In one example (I.2.1.2), the information indicates whether MPE issue is detected by the UE or not. For example, the information can be conveyed via a parameter, where the parameter value=v0 indicates that the MPE issue is not detected, and the parameter value=v1 indicates that the MPE issue is detected.

In one example (I.2.1.3), the information includes a value of the MPE. For example, the information can be conveyed via a M-bit field. When M=1, the 1-bit field indicates one of the two values $\{m_0, m_1\}$, where either both values map to (maximum or minimum) MPE values, or one of them maps to the state "MPE issue not detected", and the other maps to the state "MPE detected and a corresponding (maximum or minimum) MPE value". When M=2, the 2-bit field indicates one of the four values $\{m_0, m_1, m_2, m_3\}$, where either all values map to (maximum or minimum) MPE values, or one of them maps to the state "MPE issue not detected", and the remaining map to the states "MPE detected and a corresponding (maximum or minimum) MPE value." In general, the M-bit field indicates one of the $2^M$ values $\{m_0, \ldots, m_{M-1}\}$, where either all values map to (maximum or minimum) MPE values, or one of them maps to the state "MPE issue not detected", and the remaining map to the states "MPE detected and a corresponding (maximum or minimum) MPE value." The set of values $\{m_0, m_1, \ldots, m_{M-1}\}$ can be fixed, or configured, e.g., via RRC and/or MAC CE and/or DCI. Alternatively, a maximum value for the MPE is configured, e.g., via RRC and/or MAC CE and/or DCI, and the set of values $\{m_0, m_1, \ldots, m_{M-1}\}$ is determined based on the configured maximum value. In one example, the set of MP values corresponds to the (maximum or minimum) power headroom (PHR) or virtual PHR or Power Management Maximum Power Reduction (P-MPR) or UL duty-cycle values. In one example, the PHR or virtual PHR is defined as a difference between the maximum available transmit power (e.g. Pc,max) and the required transmit power.

In one example (I.2.1.4), the information includes a value of the MPE. For example, the information can be conveyed via a parameter taking a value from a set comprising M values. When M=2, the parameter indicates one of the two values $\{m_0, m_1\}$, where either both values map to (maximum or minimum) MPE values, or one of them maps to the state "MPE issue not detected", and the other maps to the state "MPE detected and a corresponding (maximum or minimum) MPE value". When M=4, the parameter indicates one of the four values $\{m_0, m_1, m_2, m_3\}$, where either all values map to (maximum or minimum) MPE values, or one of them maps to the state "MPE issue not detected", and the remaining map to the states "MPE detected and a corresponding (maximum or minimum) MPE value." In general, the parameter indicates one of the M values $\{m_0, m_1, \ldots, m_{M-1}\}$, where either all values map to (maximum or minimum) MPE values, or one of them maps to the state "MPE issue not detected", and the remaining map to the states "MPE detected and a corresponding (maximum or minimum) MPE value." The set of values $\{m_0, m_1, \ldots, m_{M-1}\}$ can be fixed, or configured, e.g., via RRC and/or MAC CE and/or DCI. Alternatively, a maximum value for the MPE is configured, e.g., via RRC and/or MAC CE and/or DCI, and the set of values $\{m_0, m_1, \ldots, m_{M-1}\}$ is determined based on the configured maximum value. In one example, the set of MP values corresponds to the (maximum or minimum) power headroom (PHR) or virtual PHR or Power Management Maximum Power Reduction (P-MPR) or UL duty-cycle values. In one example, the PHR or virtual PHR is defined as a difference between the maximum available transmit power (e.g. Pc,max) and the required transmit power.

In one sub-embodiment (I.2.2), the reporting of the MPE condition is determined (or configured) according to at least one of the following examples.

In one example (I.2.2.1), the MPE condition can always be included the beam report (i.e., reported by the UE).

In one example (I.2.2.2), the MPE condition can always be included the beam report (i.e., reported by the UE) when a condition is met, wherein, for example, the condition being that the UE is equipped with multiple antenna panels, or that the UE reports this (the UE-recommendation) as part of its UE capability, or that an event of interest can be detected by the UE.

In one example (I.2.2.3), the reporting of the MPE condition is configured via RRC and/or MAC CE (and/or triggered via DCI). When configured (or triggered), the UE always reports the MPE condition, otherwise, the UE does not report it. The UE can also be configured with a maximum value for the MPE. In one example, the configuration and/or triggering is UE-specific, in another example, the configuration and/or triggering is UE-group specific, in another example, the configuration and/or triggering is cell-specific.

In one example (I.2.2.4), the reporting of the MPE condition is reported by the UE without any configuration/triggering from the NW (i.e., the UE can initiate such reporting).

In one example (I.2.2.5), the capability of reporting of the MPE condition is reported by the UE (e.g., via UE capability reporting or as part of an UL transmission). Depending on the reported UE capability, the NW/gNB can configure (or trigger) the reporting of the MPE condition via RRC and/or MAC CE (and/or DCI). The UE reports the MPE condition according to the configuration/triggering from the NW/gNB.

In one example (I.2.2.6), the UE decides (has the freedom to decide) whether the MPE condition is included in the beam report, i.e., the UE may or may not include the MPE condition in the beam report. For instance, such a decision can be made based on the event of interest. In one example, the beam report (with or without the MPE condition) is reported via a one-part UCI (similar to WB CSI reporting in Rel. 15 NR, the UE can append a fixed number of zeros in order to ensure that the payload remains the same regardless of whether the UE reports the MPE condition or not). In one example, the beam report (with or without the MPE condition) is reported via a two-part UCI, wherein part 1 UCI includes an information whether the UE reports the MPE condition or not. If the information indicates the MPE condition being reported, it is reported via part 2 UCI.

In one sub-embodiment (I.2.3), in addition to $Q_1$ resource indicators (I) or $Q_1$ pairs of (I,J)=(resource indicator, beam metric) and MPE condition, the beam report can also include a UE-recommendation for UL TX beam selection/indication (by the NW/gNB), where the details about the UE-recommendation are as described in impediment I.1. Also, the MPE condition and the UE-recommendation can either be reported jointly or separately.

Upon receiving the beam report, the NW/gNB configures/indicates the UL TX beam indication (which can be the same as DL TX beam indication since beam correspondence holds) to the UE for UL transmission, where the beam indication indicates $N \geq 1$ UL TX beam(s). The beam indication can be via DL-TCI or UL-TCI or J-TCI (joint TCI) or other functionally equivalent entity such as SpatialRelationInfo or SRI that is indicated via DCI and/or MAC CE and/or RRC. In one example N=1. In one example, N=2. Also, the beam indication can include a message (such as ACK or NACK/NULL), where the details about the message are as described in embodiment I.1 and/or 1.4.

In one sub-embodiment (I.2.4), a UE provides two sets of reports, either with a same report or separately in two different reports, wherein;
  A first report (sub-report) is a beam report including resource indicator(s) and possibly beam metrics, without reflecting the MPE condition.
  A second report (sub-report) is a beam report including resource indicator(s) and possibly beam metrics, reflecting the MPE condition. For example, the reported resource indicator(s) take into account the MPE effect. The beam metrics include the MPE effect.

In one example, this behavior is configurable/triggered to the UE via RRC and/or MAC CE and/or DCI. When configured, the UE provides two reports (sub-reports), else it provides one report (the first report). In one example, the configuration and/or triggering is UE-specific, in another example, the configuration and/or triggering is UE-group specific, in another example, the configuration and/or triggering is cell-specific.

Beam Indication by UE

Figure 15:
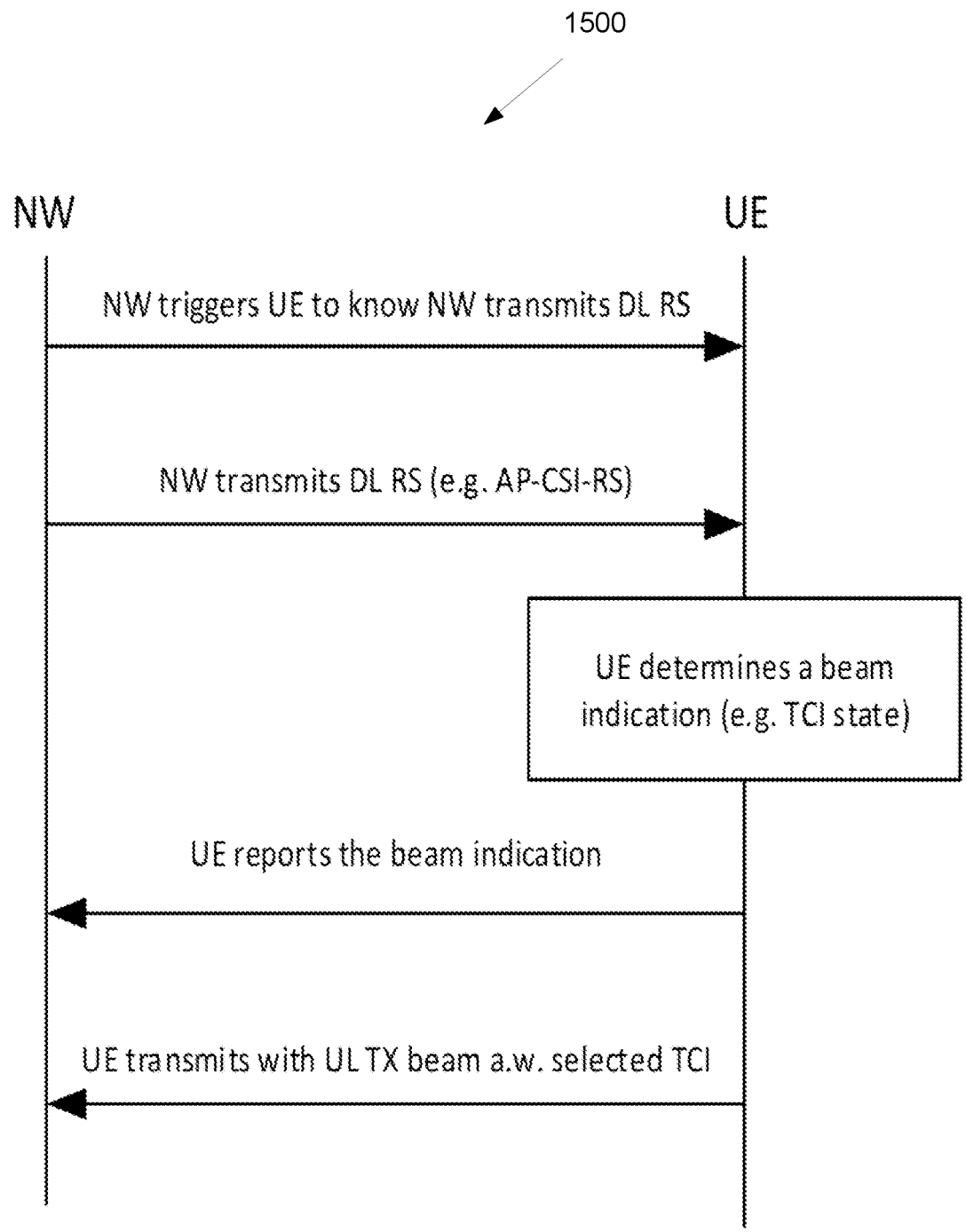
FIG. 15 illustrates a flow diagram illustrating a UE configured to measure DL measurement RS resources and report a beam indication according to embodiments of the present disclosure.

In one embodiment (I.3) illustrated in FIG. 15, a flow diagram illustrating a UE configured to measure DL measurement RS resources and report a beam indication 1500 is shown. The embodiment of the UE configured to measure DL measurement RS resources and report a beam indication 1500 illustrated in FIG. 15 is for illustration only. FIG. 15 does not limit the scope of this disclosure to any particular implementation of the UE configured to measure DL measurement RS resources 1500.

As shown in FIG. 15, a UE is configured (by the NW/gNB) to measure (receive) $P_1$ DL measurement RS resources (such as CSI-RS or SSB), where $P_1 \geq 1$, and the details about this measurement are as described in embodiment I.1. A UE is further configured to report/indicate a beam indication for the UL TX beam (to the NW/gNB), where the beam indication can comprise $Q_1$ resource indicators or TCI states (or SpatialRelationInfo). In one example, $Q_1=1$. In one example, $Q_1$ is configured via RRC and/or MAC CE. In one example, the UE doesn't report an associated beam metric (such as L1-RSRP or L1-SINR or CQI). In one example, the UE also reports an associated beam metric (such as L1-RSRP or L1-SINR or CQI). The details about the beam metric are as described in embodiments I.1 and I.2.

In one example, a resource indicator can correspond to a CRI (indicting a CRI-RS resource index) or SSBRI (indicting a SSB/PBCH resource index), and the corresponding reporting of the beam indication can be configured via higher layer parameter ReportQuantity set to 'cri' or 'ssb-Index'. In one example, a TCI state can correspond to a UL-TCI or DL-TCI or J-TCI, or SpatialRelationInfo (including a state ID and a CSI-RS or SSB/PBCH resource index), and the corresponding reporting of the beam indication can be configured via higher layer parameter ReportQuantity set to 'tci' or 'ul-tci' or 'dl-tci' or SpatialRelationInfo'.

In one example, a resource indicator can correspond to a panel ID (or set ID or subset ID), and the corresponding reporting of the beam indication can be configured via higher layer parameter ReportQuantity='panel ID' or 'set ID' or 'subset ID'. The details about the panel ID (or set ID or subset ID) are as described in embodiments I.1 and I.2.

In one example, a resource indicator can correspond to a CRI and a panel ID (or set ID or subset ID), and the corresponding reporting of the beam indication can be configured via higher layer parameter ReportQuantity='cri-panel ID' or 'ssb-Index-panel ID' (or 'cri-set ID' or 'ssb-Index-set ID' 'cri-subset ID' or 'ssb-Index-subset ID'). The details about the panel ID (or set ID or subset ID) are as described in embodiments I.1 and 1.2.

Note that there is no beam indication by the NW/gNB. Hence, an UL grant scheduling the UL transmission can be sent at the triggering stage or right after the UE reports/indicates the beam indication. Note also that the latency of the UL TX beam indication can be reduced since the beam indication by the NW/gNB, which imposes additional latency, is replaced/merged with the beam reporting step (cf. embodiment I.1 and I.2).

In one example, the UL TX beam indication as described above can be configured via (implicit or explicit) parameter or field, that can be configured via RRC and/or MAC CE and/or DCI. In one example, the configuration is UE-specific, in another example, the configuration is UE-group specific, in another example, the configuration is cell-specific.

In one example, if a UE doesn't support beam indication, even if configured to provide beam indication, the UE doesn't provide beam indication and a beam indication is provided in the UL grant from the gNB.

In one example, if a UE doesn't report beam indication, even if configured to provide beam indication, a beam indication is provided in the UL grant from the gNB.

In one example, before a beam indication is provided by a UE, a beam indication is provided in the UL grant from the gNB.

In another example, before a beam indication is provided by a UE, no beam indication is provided in the UL grant from the gNB, wherein the beam indication is assumed to follow the beam of the SSB indicated by the latest RACH procedure.

In one sub-embodiment (I.3.1), the UE is configured to select/indicate/report a beam indication indicating $Q_1$ indicator, wherein each indicator indicates a panel (and/or beam pair) from a set a configured panels and/or beam pairs. The set of panels and/or beam pairs can be configured via RRC and/or MAC CE and/or DCI. In one example, $Q_1=1$. In one example, $Q_1$ is configured via RRC and/or MAC CE.

In one sub-embodiment (I.3.2), the UE is configured with a preferred beam for each panel, and the UE is further configured to select/report/indicate a beam indication indicating a panel ID using the preferred beam of that panel (as indicated by the network).

In one embodiment (I.4), which is an extension of embodiment I.3, a UE is configured to report/indicate a beam indication (to the NW/gNB) based on beam measurement (details as in this disclosure), wherein the beam indication can be joint across DL and UL or two separate beams for DL and UL, or DL only, or UL only. When the beam indication is joint, the beam indication indicates one or more than one joint DL/UL TCI states, where each joint DL/UL TCI state indicates a beam (associated with a source RS) that acts both as a receive beam for a reception of DL control (PDCCH) and/or data (PDSCH) channels, and as a transmit beam for a transmission of UL control (PUCCH) and/or data (PUSCH) channels. When the beam indication is separate, the beam indication indicates separate TCI states for DL and UL, i.e., one or more than one DL TCI states and one or more than one UL TCI states, where each DL TCI state indicates a beam (associated with a source RS) that acts as a receive beam for a reception of DL control (PDCCH) and/or data (PDSCH) channels, and each UL TCI state indicates a beam (associated with a source RS) that acts as a transmit beam for a transmission of UL control (PUCCH) and/or data (PUSCH) channels. When the beam indication is DL only, then the beam indication indicates one or more than one DL TCI states, where each DL TCI state indicates a beam (associated with a source RS) that acts as a receive beam for a reception of DL control (PDCCH) and/or data (PDSCH) channels. When the beam indication is UL only, then the beam indication indicates one or more than one UL TCI states, where each UL TCI state indicates a beam (associated with a source RS) that acts as a transmit beam for a transmission of UL control (PUCCH) and/or data (PUSCH) channels.

In one example, the NW/gNB does not send (does not transmit) any confirmation or message such as ACK or NACK in response to the beam indication from the UE. In this case, the NW/gNB assumes that the UE can use the receive beam (reported via the beam indication) to receive DL transmission or use the transmit beam (reported via the beam indication) to transmit UL transmission, potentially after a time duration from sending the beam indication, where the time duration can be fixed or configured or reported by the UE (e.g., together with the beam indication or via a separate report).

In one example, the NW/gNB does send (transmits) a confirmation or message such as ACK or NACK in response to the beam indication from the UE. This confirmation can be sent by the gNB using a gNB beam that can be according to at least one of the following examples.
  In one example, the gNB beam is the same as the beam (or one of the beams) indicated by the UE.
  In one example, the gNB beam is determined based on the beam (or one of the beams) indicated by the UE. This determination can be implicit (without additional signaling), or explicit (with additional signaling).
  In one example, the gNB beam is the original/earlier beam that the gNB was using previously (in earlier time slots). The new beam (indicated by the UE) is applied after a delay from the ACK or NACK response. The delay can depend on one or more of: numerology (smallest UL/DL numerology), UE capability, higher layer configuration, etc.

In this case, the UE waits to receive the confirmation or message sent by the gNB/NW. Once the message is received by the UE, the UE can use the receive beam (reported via the beam indication) to receive DL transmission or use the transmit beam (reported via the beam indication) to transmit UL transmission, potentially after a time duration from sending the beam indication, where the time duration can be fixed or configured or reported by the UE (e.g., together with the beam indication or via a separate report). If such as message is not received by the UE, then the UE doesn't use the receive or transmit beams reported via the beam indication, and continues to use a prior beam (old beam) which can be the latest beam that the UE was using for DL and/or UL, or it can be a default beam.

The confirmation or message from the gNB/NW can be signaled dynamically, e.g., via a DCI or MAC CE. When it is via DCI, the DCI can be a DL-DCI (e.g., DCI format 1_0, 1_1 and 1_2 in NR) with or without DL assignment, or a UL-DCI (e.g., format 0_0, 0_1, and 0_2 in NR) with or without UL grant, or other DCI formats in NR (e.g., format 2_0, 2_1, 2_2, and 2_3), or a dedicated DCI for conveying this confirmation or message. In one example, the DCI format and/or MAC CE includes a one-bit flag, wherein one logical level (e.g., logical "1") indicates a reception of a beam indication from the UE, and the other logical level (e.g., logical "0") indicates that no beam indication has been received from the UE. In one example, the confirmation or message (e.g., the one-bit flag) is sent only when the beam indication from the UE is received by the gNB (i.e., ACK confirmation), and the confirmation is not sent when the beam indication from the UE is not received by the gNB (i.e., no NACK confirmation).

Alternatively, the DL resource and channel for the confirmation or message from the NW can be pre-configured to the UE, e.g., together with the configuration for the beam indication from the UE. The time duration or the minimum time between (the time slot in which) the beam indication reported by the UE and (the time slot in which) the confirmation is sent by the NW can be fixed (hence doesn't require any signaling), or can be signaled. When signaled, it can be via RRC or MAC CE, or DCI.

The examples of gNB confirmation can also be used to transmit a message in response to a beam report or beam indication from the UE, as described earlier in this disclosure.

In one example, the beam indication by the UE can correspond to beam(s) or TCI state(s) associated with source RS(s) from non-serving cell(s) or a serving cell or a combination of serving and non-serving cells (e.g., when the UE reports multiple beams in the beam indication).

In one example, the beam indication by the UE can correspond to beam(s) or TCI state(s) associated with source RS(s) associated with a single UE antenna panel or multiple UE antenna panels (e.g., when the UE reports multiple beams in the beam indication).

Some of the details of the ACK message can be according to the same described in embodiment I.1.

In one embodiment (I.5), the beam indication as described in embodiment I.4 and I.5 is reported by the UE without any configuration/triggering from the NW, i.e., the UE can initiate/trigger such reporting (in an aperiodic manner) based on an event of interest being detected by the UE (e.g., when MPE condition is detected). The details of the beam indication reported by the UE are as described in embodiment I.3 and I.4. In particular, the gNB confirmation in response to the UE-initiated beam indication reported by the UE is according to at least one example in embodiment I.4.

Component 2—UE Procedures for UL TX Beam Selection Assuming Non-Beam Correspondence In the second component, example embodiments for the UL TX beam selection are provided for the case when beam correspondence between DL and UL does not hold, wherein the selection/indication of the UL TX beam for UL transmission is based on UL RS measurement.

Figure 16:
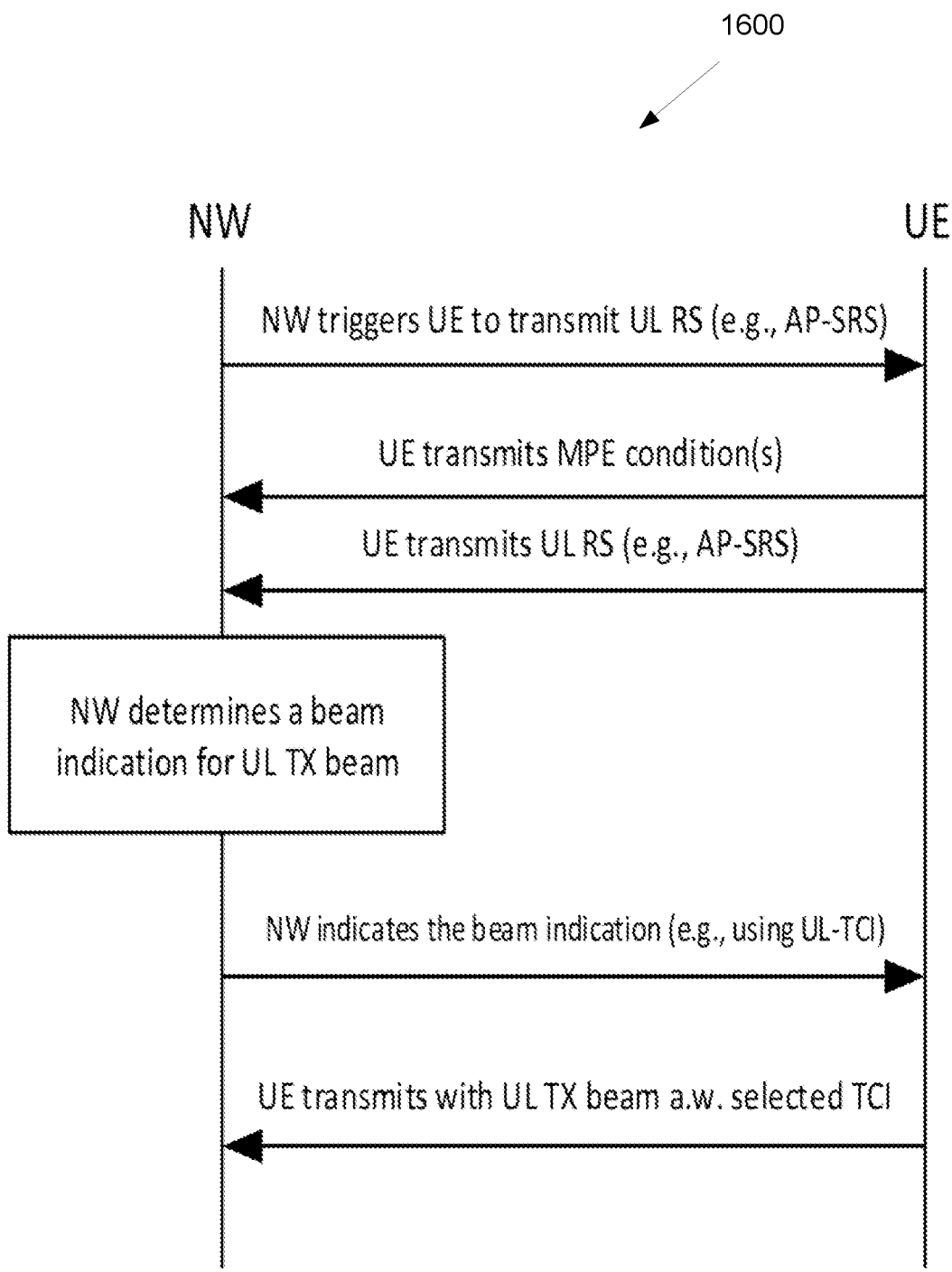
FIG. 16 illustrates a flow diagram illustrating a UE configured to transmit UL measurement RS resources and receive a beam indication according to embodiments of the present disclosure.

In one embodiment (II.1) illustrated in FIG. 16, a flow diagram illustrating a UE configured to transmit UL measurement RS resources and receive a beam indication 1600 is shown. The embodiment of the UE configured to transmit UL measurement RS resources 1600 and receive a beam indication illustrated in FIG. 16 is for illustration only. FIG. 16 does not limit the scope of this disclosure to any particular implementation of the UE configured to measure UL measurement RS resources 1600.

As shown in FIG. 16, a UE is configured (by the NW/gNB) to transmit $P_2$ UL measurement RS resources (such as SRS), where $P_2 \geq 1$. This configuration can be performed via higher-layer (RRC) signaling. Optionally, the NW/gNB can signal/update the (sub)set of SRS resources dynamically via L1 or L2 DL control (PDCCH or MAC CE). These resources are used by the UE to enable the NW/gNB to perform UL channel measurement. For instance, these $P_2$ SRS resources can be used by the NW/gNB to measure the UL channel condition along different spatial directions (represented by the precoding operation performed at the UE transparent to the NW/gNB). The time-domain behavior of the transmission of the UL measurement RS resources can be configured as aperiodic (AP), semi-persistent (SP), or periodic (P).

The UE transmits an MPE condition first, and then transmits the UL measurement RS resources. The MPE condition can be determined at the UE prior to the transmission of the UL measurement RS resources, and the precoding operation on the RS resources can be determined based on the MPE condition. The details about the MPE condition can be as described in embodiment I.2 or as described in U.S. provisional patent application 63/042,154 filed on Jun. 22, 2020 (including the possibility that MPE condition reporting can be turned ON/OFF via RRC and/or MAC and/or DCI, or is UE-initiated, or it is subject to UE capability reporting).

The NW/gNB measures (receives) the MPE condition and the UL measurement RS resources, and determines a UL TX beam indication to the UE for UL transmission, where the beam indication indicates $N \geq 1$ UL TX beam(s). The beam indication can be via UL-TCI or other functionally equivalent entity such as SpatialRelationInfo or SRI that is indicated via DCI and/or MAC CE and/or RRC. In one example N=1. In one example, N=2. Also, the beam indication can include a message (such as ACK or NACK/NULL), where the details about the message are as described in embodiment I.1 or I.2.

In one sub-embodiment (II.1.1), when the UE is equipped with X>1 antenna panels, the MPE condition corresponds to one of the X panels, and in this case, a corresponding panel ID can also be included in the MPE condition. Alternatively, the MPE condition can be reported for each panel. In one example, the information about X panels is provided to the NW/gNB. The NW/gNB can use this information to select/configure a subset of or all of X panels for UL measurement RS transmission.

In one sub-embodiment (II.1.2), the set of $P_2$ UL measurement RS resources can be partitioned into X subsets (e.g., one subset for each antenna panel or range of angles). The information about the subsets can be provided to the UE, e.g., as part of the configuration configuring UL measurement RS resources.

In one sub-embodiment (II.1.3), the $P_2$ UL measurement RS resources is a super-set encompassing X sets (e.g., one set for each antenna panel or range of angles). The information about the sets can be provided to the UE, e.g., as part of the configuration configuring UL measurement RS resources.

In one sub-embodiment (II.1.4), the transmission of UL measurement RS resources includes the MPE effect, e.g., the transmission power of these resources is reduced by a certain amount when the MPE issue is detected. In this case, the MPE effect is implicit in the UL measurement RS resource. In one example, this behavior is configurable to the UE via RRC and/or MAC CE and/or DCI. When configured, the UE applies the power reduction, else it does not.

Figure 17:
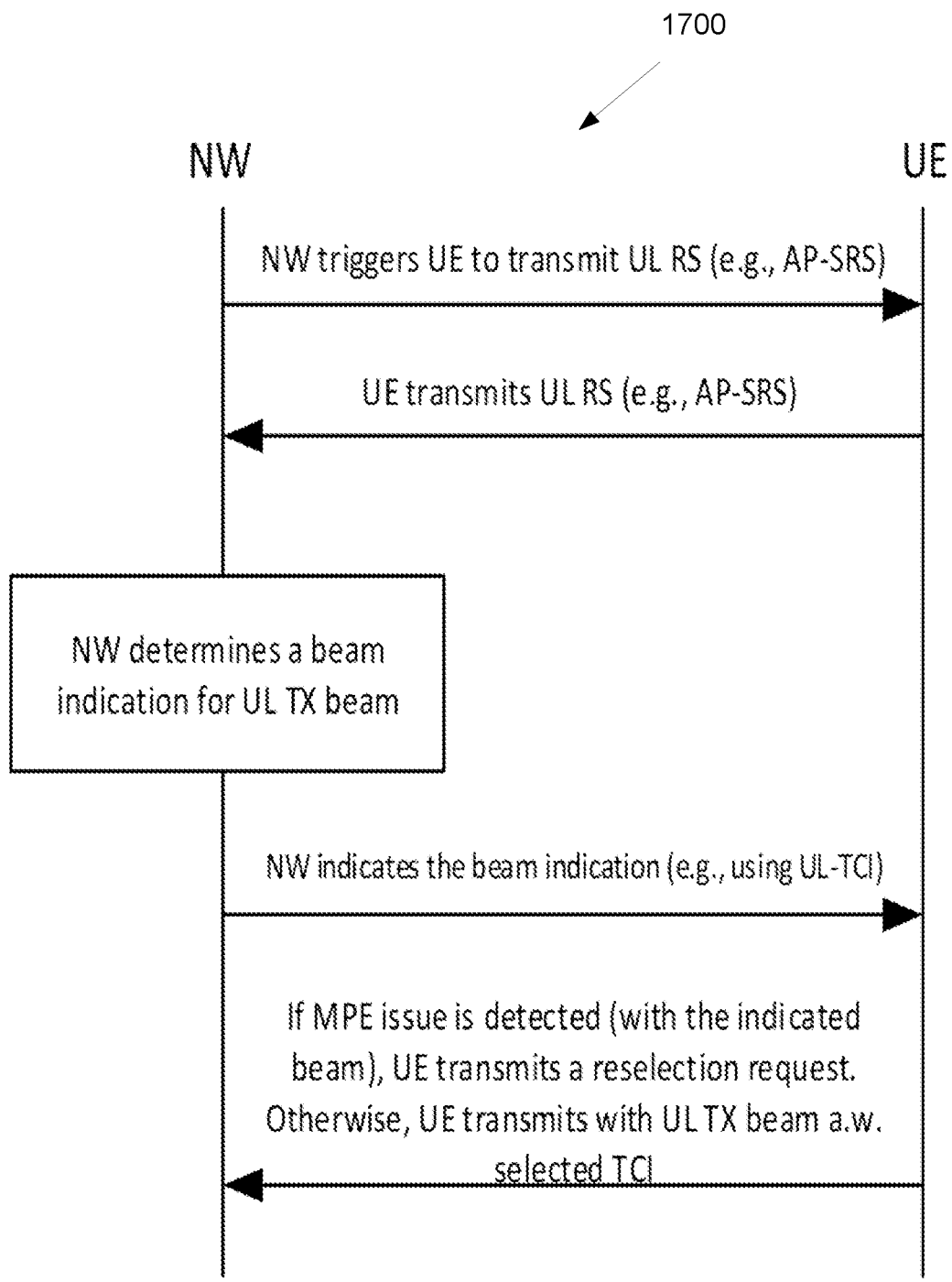
FIG. 17 illustrates a flow diagram illustrating a UE configured to transmit UL measurement RS resources and receive a beam indication according to embodiments of the present disclosure.

In one embodiment (II.2) illustrated in FIG. 17, a flow diagram illustrating a UE configured to transmit UL measurement RS resources and receive a beam indication 1700 is shown. The embodiment of the UE configured to transmit UL measurement RS resources and receive a beam indication 1700 illustrated in FIG. 17 is for illustration only. FIG. 17 does not limit the scope of this disclosure to any particular implementation of the UE configured to measure UL measurement RS resources 1700.

As shown in FIG. 17, a UE is configured (by the NW/gNB) to transmit $P_2$ UL measurement RS resources (such as SRS), where $P_2 \geq 1$, the details of this RS transmission are as described in embodiment II.1. The UE transmits the UL measurement RS resources according to the configuration. The NW/gNB measures (receives) the UL measurement RS resources, and determines a UL TX beam indication to the UE for UL transmission, where the beam indication indicates $N \geq 1$ UL TX beam(s), the details of this beam indication are as described in embodiment II.1. If there is not MPE issue, the UE transmits the UL transmission with the UL TX beam indicated the beam indication. Otherwise (when the MPE issue is detected at the UE or a change in MPE conditions is detected at the UE), the UE transmits a reselection request to the NW/gNB.

In one example, the reselection request can be transmitted via a UE-initiated mechanism, hence it doesn't accompany (or isn't linked with) any other reporting.

In another example, the UE can report a preferred SRI (or UL-TCI) together with the reselection request. In one example, the preferred SRI (or UL-TCI) indicates a $2^{nd}$ (alternate) UL TX beam. In one example, such "UL-TCI/SRI reporting" can be configured via RRC and/or MAC CE and/or DCI, e.g., when the UE can be configured with an "MPE" or "UE-initiated" mode representing a UE-initiated mechanism.

In another example, the UE transmits the reselection request first, e.g., via a "pre-notification message", then transmits the "UL-TCI/SRI".

Any of the above variation embodiments can be utilized independently or in combination with at least one other variation embodiment.

Figure 18:
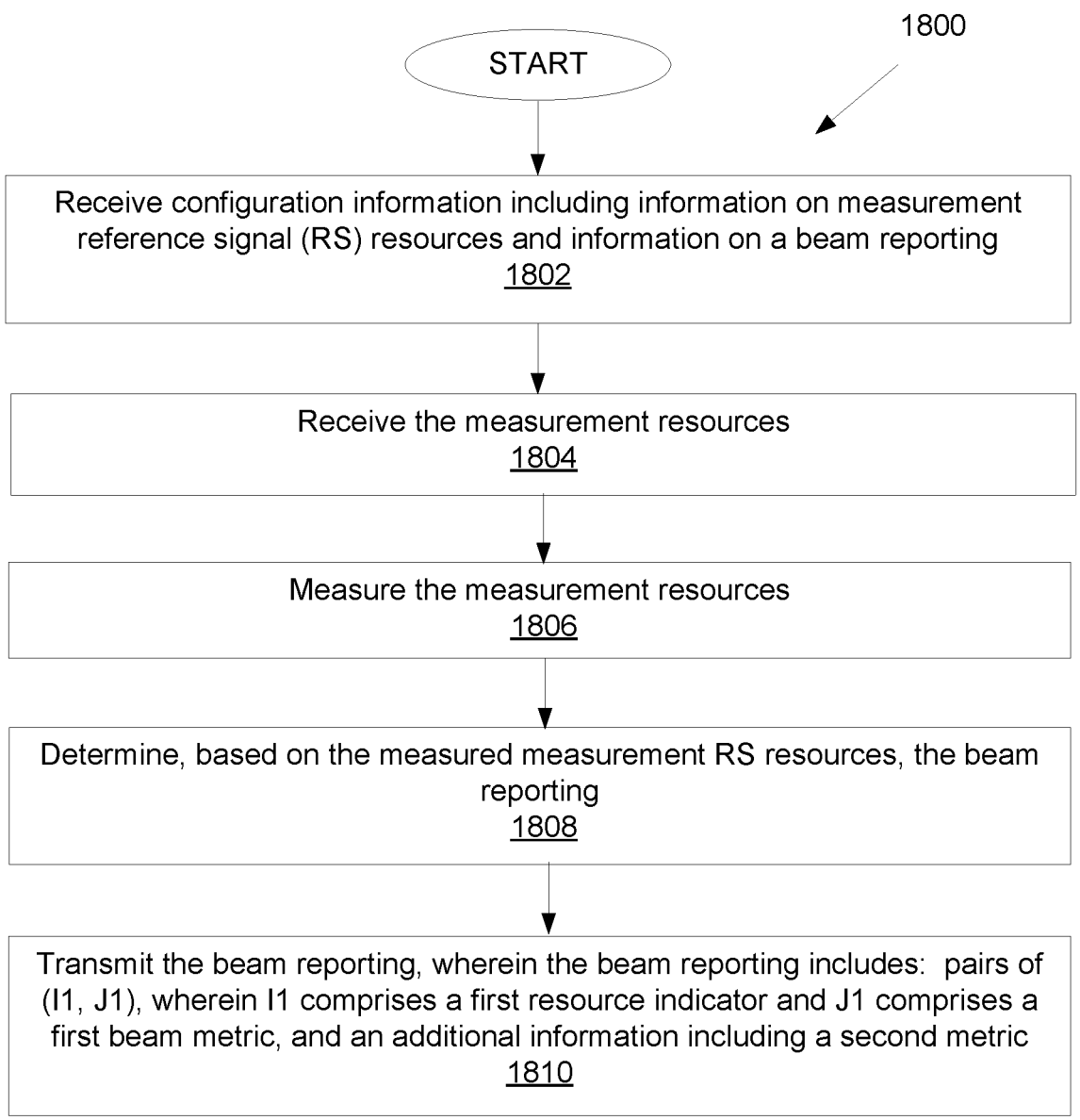
FIG. 18 illustrates a flow chart of a method for operating a UE according to embodiments of the present disclosure.

FIG. 18 illustrates a flow chart of a method 1800 for operating a user equipment (UE), as may be performed by a UE such as UE 116, according to embodiments of the present disclosure. The embodiment of the method 1800 illustrated in FIG. 18 is for illustration only. FIG. 18 does not limit the scope of this disclosure to any particular implementation.

As illustrated in FIG. 18, the method 1800 begins at step 1802. In step 1802, the UE (e.g., 111-116 as illustrated in FIG. 1) receives configuration information including information on measurement reference signal (RS) resources and information on a beam reporting.

In step 1804; the UE receives the measurement RS resources.

In step 1806, the UE measures the measurement RS resources.

In step 1808, the UE determines, based on the measured measurement RS resources, the beam reporting.

In step 1810, the UE transmits the beam reporting, wherein the beam reporting includes: $Q_1$ pairs of (I1, J1), wherein I1 comprises a first resource indicator and J1 comprises a first beam metric, and an additional information including a second metric.

In one embodiment, the measurement RS resources comprise at least one of channel state information reference signals (CSI-RSs) and synchronization signal blocks (SSBs).

In one embodiment, the first beam metric is a level 1-reference signal receive power (L1-RSRP) or a level 1-signal to interference and noise ratio (L1-SINR).

In one embodiment, the additional information comprises $Q_2$ pairs of (I2, J2); I2 comprises a second resource indicator and J2 comprises a second beam metric; the $Q_2$ pairs of (I2, J2) are determined based on whether a maximum permissible exposure (MPE) limit is met or not; and the second metric is the second beam metric.

In one embodiment, at least one of $Q_1$ and $Q_2$ is non-zero.

In one embodiment, the second metric is power headroom (PHR).

In one embodiment, the second metric is (1) determined based on whether a maximum permissible exposure (MPE) limit is met and (2) takes a value from multiple values, one value from the multiple values indicating that the MPE limit is met, and each of the remaining values from the multiple values indicating an MPE value by which the MPE limit is not met.

In one embodiment, the UE determines whether the beam reporting includes the additional information, the beam reporting is based on a two-part uplink control information (UCI) including a UCI part 1 and a UCI part 2, the UCI part 1 includes the $Q_1$ pairs of (I1, J1) and an indicator indicating whether the additional information is included in the beam reporting, and when the indicator indicates that the additional information is included in the beam reporting, the UCI part 2 includes the additional information.

Figure 19:
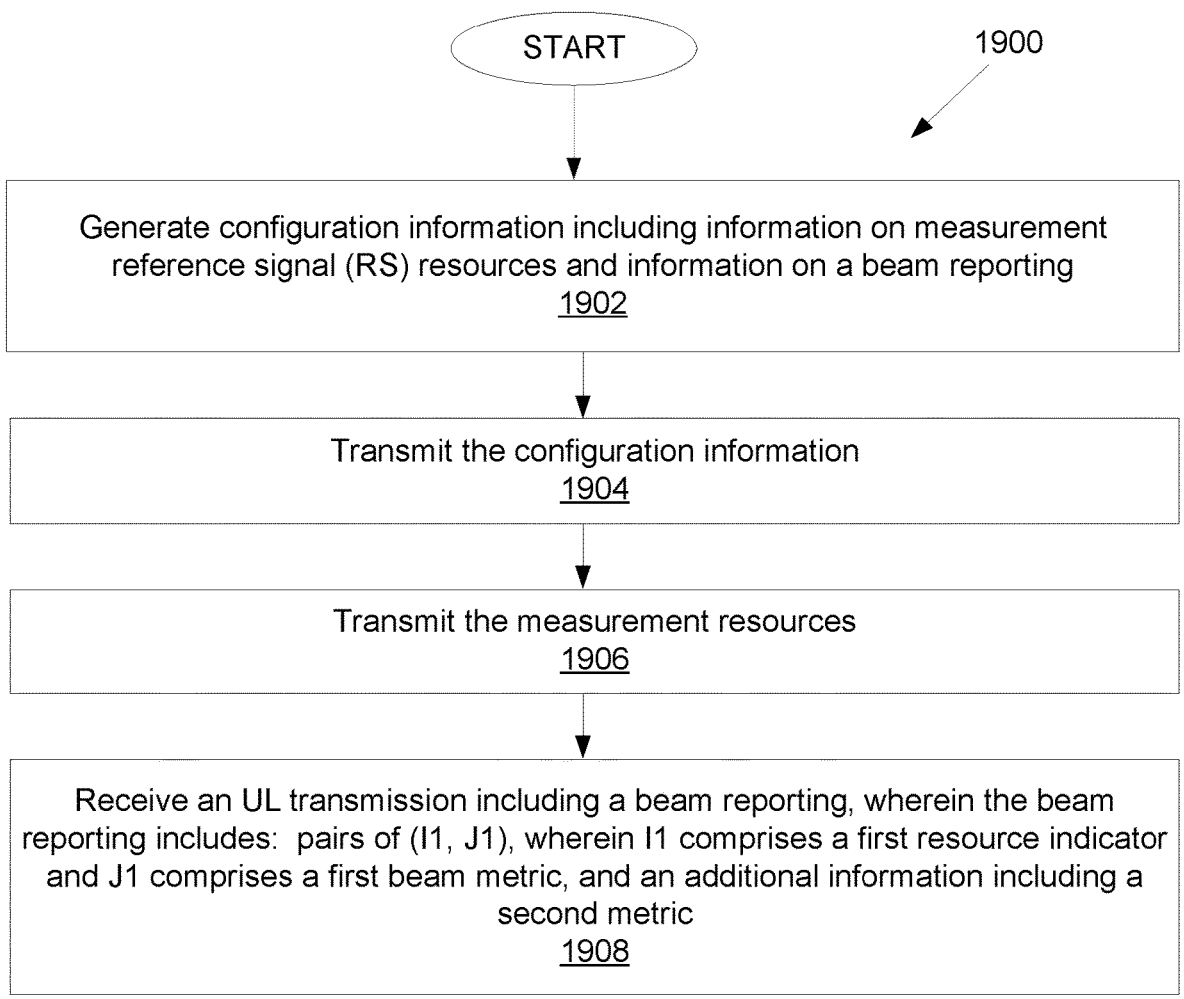
FIG. 19 illustrates a flow chart of a method for operating a BS according to embodiments of the present disclosure.

FIG. 19 illustrates a flow chart of another method 1900, as may be performed by a base station (BS) such as BS 102, according to embodiments of the present disclosure. The embodiment of the method 1900 illustrated in FIG. 19 is for illustration only. FIG. 19 does not limit the scope of this disclosure to any particular implementation.

As illustrated in FIG. 19, the method 1900 begins at step 1902. In step 1902, the BS (e.g., 101-103 as illustrated in FIG. 1), generates configuration information including information on measurement reference signal (RS) resources and information on a beam reporting.

In step 1904, the BS transmits the configuration information.

In step 1906, the BS transmits the measurement RS resources.

In step 1908, the BS receives an uplink transmission including a beam reporting, wherein the beam reporting includes: $Q_1$ pairs of (I1, J1), wherein I1 comprises a first resource indicator and J1 comprises a first beam metric, and an additional information including a second metric.

In one embodiment, the measurement RS resources comprise at least one of channel state information reference signals (CSI-RSs) and synchronization signal blocks (SSBs).

In one embodiment, the first beam metric is a level 1-reference signal receive power (L1-RSRP) or a level 1-signal to interference and noise ratio (L1-SINR).

In one embodiment, the additional information comprises $Q_2$ pairs of (I2, J2); I2 comprises a second resource indicator and J2 comprises a second beam metric; the $Q_2$ pairs of (I2, J2) are determined based on whether a maximum permissible exposure (MPE) limit is met or not; and the second metric is the second beam metric.

In one embodiment, at least one of $Q_1$ and $Q_2$ is non-zero.

In one embodiment, the second metric is power headroom (PHR).

In one embodiment, the second metric is (1) determined based on whether a maximum permissible exposure (MPE) limit is met and (2) takes a value from multiple values, one value from the multiple values indicating that the MPE limit is met, and each of the remaining values from the multiple values indicating an MPE value by which the MPE limit is not met.

In one embodiment, the beam reporting is based on a two-part uplink control information (UCI) including a UCI part 1 and a UCI part 2, the UCI part 1 includes the $Q_1$ pairs of (I1, J1) and an indicator indicating whether the additional information is included in the beam reporting, and when the indicator indicates that the additional information is included in the beam reporting, the UCI part 2 includes the additional information.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver configured to:
      receive configuration information including information on measurement reference signal (RS) resources and information on a beam reporting; and
      receive the measurement RS resources; and
   a processor operably coupled to the transceiver, the processor configured to:
      measure the measurement RS resources; and
      determine, based on the measured measurement RS resources, the beam reporting, wherein the transceiver is further configured to transmit the beam reporting, wherein the beam reporting includes:
         $Q_1$ pairs of (I1, MPE1), wherein:
            I1 comprises a first resource indicator and MPE1 is a maximum permissible exposure (MPE) value associated with the first resource indicator, and
            $Q_1 \geq 1$, wherein the beam reporting is included in a power headroom report (PHR).

2. The UE of claim 1, wherein the measurement RS resources comprise at least one of channel state information reference signals (CSI-RSs) and synchronization signal blocks (SSBs).

3. The UE of claim 1, further comprising a beam metric associated with each resource indicator, wherein the beam metric indicates one of a level 1-reference signal receive power (L1-RSRP) or a level 1-signal to interference and noise ratio (L1-SINR).

4. The UE of claim 1, wherein:
the processor is further configured to determine whether the beam reporting includes additional information,
the beam reporting is based on a two-part uplink control information (UCI) including a UCI part 1 and a UCI part 2,
the UCI part 1 includes the $Q_1$ pairs of (I1, J1) and an indicator indicating whether the additional information is included in the beam reporting, and
when the indicator indicates that the additional information is included in the beam reporting, the UCI part 2 includes the additional information.

5. The UE of claim 1, wherein the MPE value is (1) determined based on whether an MPE limit is met and (2) takes a value from multiple values.

6. The UE of claim 1, wherein MPE1 is indicated by two bits, and indicates one of four power management maximum power reduction (P-MPR) values.

7. The UE of claim 1, wherein:
the transceiver is further configured to transmit UE capability information, and
the beam reporting is based on the UE capability information.

8. A base station (BS) comprising:
a processor configured to:
generate configuration information including information on measurement reference signal (RS) resources and information on a beam reporting; and
a transceiver operably coupled to the processor, the transceiver configured to:
transmit the configuration information;
transmit the measurement RS resources; and
receive an uplink transmission including a beam reporting,
wherein the beam reporting includes:
$Q_1$ pairs of (I1, MPE1), wherein:
I1 comprises a first resource indicator and MPE1 is a maximum permissible exposure (MPE) value associated with the first resource indicator, and
$Q_1 \geq 1$,
wherein the beam reporting is included in a power headroom report (PHR).

9. The BS of claim 8, wherein the measurement RS resources comprise at least one of channel state information reference signals (CSI-RSs) and synchronization signal blocks (SSBs).

10. The BS of claim 8, wherein:
a beam metric is associated with each resource indicator, and
the beam metric indicates one of a level 1-reference signal receive power (L1-RSRP) or a level 1-signal to interference and noise ratio (L1-SINR).

11. The BS of claim 8, wherein:
the beam reporting is based on a two-part uplink control information (UCI) including a UCI part 1 and a UCI part 2,
the UCI part 1 includes the $Q_1$ pairs of (I1, J1) and an indicator indicating whether additional information is included in the beam reporting, and
when the indicator indicates that the additional information is included in the beam reporting, the UCI part 2 includes the additional information.

12. The BS of claim 8, wherein the MPE value is (1) determined based on whether an MPE limit is met and (2) takes a value from multiple values.

13. The BS of claim 8, wherein MPE1 is indicated by two bits, and indicates one of four power management maximum power reduction (P-MPR) values.

14. The BS of claim 8, wherein:
the transceiver is further configured to receive user equipment (UE) capability information, and
the beam reporting is based on the UE capability information.

15. A method for operating a user equipment (UE), the method comprising:
receiving configuration information including information on measurement reference signal (RS) resources and information on a beam reporting;
receiving the measurement RS resources;
measuring the measurement RS resources;
determining, based on the measured measurement RS resources, the beam reporting; and
transmitting the beam reporting,
wherein the beam reporting includes:
$Q_1$ pairs of (I1, MPE1), wherein:
I1 comprises a first resource indicator and MPE1 is a maximum permissible exposure (MPE) value associated with the first resource indicator, and
$Q_1 \geq 1$,
wherein the beam reporting is included in a power headroom report (PHR).

16. The method of claim 15, wherein the measurement RS resources comprise at least one of channel state information reference signals (CSI-RSs) and synchronization signal blocks (SSBs).

17. The method of claim 15, wherein:
a beam metric is associated with each resource indicator, and
the beam metric indicates one of a level 1-reference signal receive power (L1-RSRP) or a level 1-signal to interference and noise ratio (L1-SINR).

18. The method of claim 15, further comprising determining the MPE value based on whether an MPE limit is met, wherein the MPE value takes a value from multiple values.

19. The method of claim 15, wherein MPE1 is indicated by two bits, and indicates one of four power management maximum power reduction (P-MPR) values.

20. The method of claim 15, further comprising:
transmitting UE capability information,
wherein the beam reporting is based on the UE capability information.

* * * * *